US011863040B2

(12) United States Patent
Ieta

(10) Patent No.: US 11,863,040 B2
(45) Date of Patent: Jan. 2, 2024

(54) ELECTROHYDRODYNAMIC ROTARY SYSTEMS AND RELATED METHODS

(71) Applicant: Research Foundation for the State University of New York, Albany, NY (US)

(72) Inventor: Adrian Ieta, Albany, NY (US)

(73) Assignee: The Research Foundation for SUNY, Albany, NY (US)

( * ) Notice: Subject to any disclaimer, the term of this patent is extended or adjusted under 35 U.S.C. 154(b) by 424 days.

(21) Appl. No.: 17/057,465

(22) PCT Filed: May 21, 2019

(86) PCT No.: PCT/US2019/033413
§ 371 (c)(1),
(2) Date: Nov. 20, 2020

(87) PCT Pub. No.: WO2019/226712
PCT Pub. Date: Nov. 28, 2019

(65) Prior Publication Data
US 2021/0143722 A1    May 13, 2021

Related U.S. Application Data

(60) Provisional application No. 62/674,022, filed on May 21, 2018.

(51) Int. Cl.
*H02K 44/06* (2006.01)
*F21Y 115/10* (2016.01)
(Continued)

(52) U.S. Cl.
CPC ............... *H02K 44/06* (2013.01); *B63H 7/02* (2013.01); *B64C 11/20* (2013.01); *H02K 99/20* (2016.11);
(Continued)

(58) Field of Classification Search
CPC .......... H02K 44/06; H02K 99/20; B63H 7/02; B64C 11/20; B64C 11/00; F04D 13/06; B64D 27/24; H01T 19/04; Y02T 50/60
See application file for complete search history.

(56) References Cited

U.S. PATENT DOCUMENTS

| 2012/0036998 | A1* | 2/2012 | June | F04D 27/00 95/57 |
| 2018/0169666 | A1* | 6/2018 | Loreth | B03C 3/41 |

* cited by examiner

*Primary Examiner* — Michael C Zarroli
(74) *Attorney, Agent, or Firm* — Lance D. Reich; Peter Fallon; Austin Winter

(57) ABSTRACT

An electrohydrodynamic rotary system and related method that include at least one rotary device comprising a hub portion, an axis of rotation, and at least one blade extending radially from the hub portion. The system includes at least one electrically conductive rotary electrode emitter coupled to the at least one blade proximate to the back edge, and at least one electrically conductive counter electrode positioned proximate to the at least one rotary device in a spaced relationship. The system further includes an electrical system that applies an electric potential difference between the at least one electrically conductive rotary electrode emitter and the at least one electrically conductive counter electrode that generates corona discharges from the at least one rotary electrode that form flows of ionic wind that rotate the at least one rotary device about the axis of rotation in a first direction.

20 Claims, 17 Drawing Sheets

(51) Int. Cl.
  *B64C 23/00* (2006.01)
  *H01T 23/00* (2006.01)
  *B64C 11/20* (2006.01)
  *H02K 99/00* (2014.01)
  *B63H 7/02* (2006.01)
  *F04D 13/06* (2006.01)
(52) U.S. Cl.
  CPC ............ *B64C 23/005* (2013.01); *F04D 13/06* (2013.01); *F21Y 2115/10* (2016.08); *H01T 23/00* (2013.01)

ELECTROHYDRODYNAMIC ROTARY SYSTEMS AND RELATED METHODS

CROSS REFERENCE TO RELATED APPLICATION

This application perfects and claims priority benefit to U.S. Provisional Patent Application No. 62/674,022, filed May 21, 2018, and entitled An Electrohydrodynamic Rotational Device, the entire contents of which is hereby incorporated herein by reference.

FIELD OF THE DISCLOSURE

The present invention generally relates to electrohydrodynamic (EHD) powered rotary systems that utilize ionic wind induced in highly inhomogeneous electric field to effectuate rotational force/motion of objects.

BACKGROUND

Electrohydrodynamic (EHD) flow or corona discharge is generated as a result of the local ionization of a fluid surrounding an electrode when relatively high voltage is applied thereto. A corona discharge will occur when the strength of the electric field (potential gradient) around the electrode is high enough to form a conductive region, but not high enough to cause electrical breakdown or arcing to nearby objects. Ionized molecules and ions created in this highly non-uniform electric field accelerate in the electric field and impart momentum to neutral atoms and molecules, creating or generating air flow known as corona discharge, corona wind, ionic wind or electric wind (these terms are used synonymously herein). EHD flow can be generated in positive or negative polarities, as well as in direct current (DC) or alternating current (AC) coronas. In a positive polarity and above the corona onset voltage, mostly positive ions are typically generated while in negative polarity mostly negative ions are generated.

Because EHD flow systems can be silent, operate on relatively low power, and require no moving parts, ionic wind devices have been proposed for a wide range of applications. One current application of EHD flow is levitation (commonly known as the Biefeld-Brown effect), which employs ionic wind and the principle of conservation of momentum to generate thrust/lift from a static electrode to elevate an aircraft. Electro-aerodynamic (EAD) propulsion of aerial vehicles utilizing relatively high voltage to ionize the air surrounding the vehicle, and thereby accelerating the ions through repulsion and conservation of momentum to generate an ionic wind, have also recently been discussed. However, it is difficult for such vehicles to achieve take off and fly in large part due to the weight of the required power electronics.

Improved EHD flow-based rotary systems and methods are thereby needed to produce usable rotational forces for any number of a variety of differing potential applications.

SUMMARY

The following is a summary of the disclosure in order to provide some aspects of invention(s) disclosed herein. This summary is not intended to identify all key or critical elements of the invention(s) or to delineate the entire scope of the invention(s). Its sole purpose is to present some concepts of the invention(s) as a prelude to the more detailed description that is presented later.

Reference throughout this specification to "one embodiment" or "an embodiment" means that a particular feature, structure or characteristic described in connection with an embodiment is included in at least one embodiment of an invention disclosed herein. Thus, instances of phrases such as in "an embodiment," "one embodiment," "some embodiments" and the like in various places throughout this specification are not necessarily all referring to the same embodiment. Furthermore, particular features, structures or characteristics of one embodiment may be combined with or replace particular features, structures or characteristics of another embodiment (e.g., to provide the same or similar function and/or advantage thereof).

It should be appreciated that all combinations of the foregoing aspects and additional concepts discussed in greater detail below (provided such concepts are not mutually inconsistent) are contemplated as being part of the inventive subject matter disclosed herein.

The corona wind-activated rotary or rotational devices, systems and methods disclosed herein utilize EHD flow generated as a result of local ionization of the atmosphere near one or more end of one or more rotary electrode of a rotary device in an electric field between the electrode and a counter electrode when high voltage above corona onset is applied to the one or more electrode. The ions accelerate in the electric field between the electrode and the counter electrode and transfer momentum to neutral atoms and molecules generating corona discharge/corona wind/ionic wind/electric wind (these terms are used synonymously herein) that effectuates rotational movement/torque of the rotary device.

In a positive polarity and above the corona onset voltage, mostly positive ions are generated during the ionization, while in negative polarity mostly negative ions are generated during the ionization. Both positive and negative polarity of the corona onset voltage applied to the one or more rotary electrode of the rotary device produces the electric wind, and thereby effectuates rotational movement/torque of the rotary device.

In one aspect, the present disclosure provides an electrohydrodynamic (EHD) rotary system. The EHD rotary system comprises at least one rotary device comprising a hub portion, an axis of rotation, and at least one blade extending radially from the hub portion to a tip thereof, the a least one blade comprising a front leading edge, a back trailing edge and top and bottom surfaces that extend between the front and back edges. The EHD rotary system further comprises at least one rotary electrode emitter, the at least one rotary electrode being electrically conductive and coupled to the at least one blade of the at least one rotary device proximate to the back edge thereof. The EHD rotary system also comprises at least one counter electrode, the at least one counter electrode being electrically conductive and positioned proximate to the at least one rotary device in a spaced relationship. The EHD rotary system further comprises an electrical system comprising a voltage source including a first terminal that is electrically coupled to the at least one rotary electrode emitter and a second terminal that is electrically coupled to the at least one counter electrode, the voltage source comprising an electric potential difference between the first and second terminals that generates corona discharges from the at least one rotary electrode that form flows of ionic wind emanating therefrom that rotate the at least one rotary device about the axis of rotation in a first direction.

In some embodiments, the electrical system comprises a battery, a generator, a fuel cell, a solar cell, an electrical grid input line, a supercapacitor, or a combination thereof. In some embodiments, the electrical system applies a negative polarity relatively high-voltage above corona onset to the at least one rotary electrode emitter of the at least one blade. In some embodiments, the electrical system applies a positive polarity relatively high-voltage above corona onset to the at least one rotary electrode emitter of the at least one blade. In some embodiments, the electrical system applies a direct electrical current to the at least one rotary electrode emitter of the at least one blade. In some embodiments, the electrical system applies an alternating electrical current to the at least one rotary electrode emitter of the at least one blade.

In some embodiments, the hub portion comprises an electrically conductive portion that is electrically coupled to the at least one rotary electrode emitter. In some embodiments, the at least one rotary electrode emitter comprises at least one radially-extending electrically conductive member extending proximate to the back trailing edge. In some such embodiments, at least a first outer surface portion of the at least one radially-extending electrically conductive member proximate to the back edge is exposed. In some such embodiments, the system further comprises an electrically insulative material extending over at least a second outer surface portion of the at least one radially-extending electrically conductive member proximate to the front edge. In some such embodiments, the electrically insulative material comprises a dielectric strength of at least 30 kV/mm. In some other such embodiments, the electrically insulative material comprises an electrically insulative portion of the at least one blade, a rigid electrically insulative member affixed to the second outer surface portion, a flexible electrically insulative member affixed to the second outer surface portion, or an electrically insulative conductive paint painted over the second outer surface portion. In some other such embodiments, the electrically insulative material comprises a dielectric material, a semiconductor material, an electrical insulator material or a combination thereof.

In some embodiments, the at least one radially-extending electrically conductive member extends over the back edge of the at least one blade. In some embodiments, the at least one radially-extending electrically conductive member extends over at least one of the top surface and the bottom surface proximate to the back edge of the at least one blade. In some embodiments, the at least one radially-extending electrically conductive member is spaced from the front edge of the at least one blade. In some embodiments, the at least one radially-extending electrically conductive member comprises a plurality of radially spaced electrically conductive members.

In some embodiments, the at least one radially-extending electrically conductive member extends along at least a portion of the hub portion and the at least one blade. In some embodiments, the at least one radially-extending electrically conductive member comprises an integral member affixed to an outer surface portion of the at least one blade, a member embedded at least partially within the at least one blade, a conductive paint painted over an outer surface portion of the at least one blade or a conductive tape affixed over an outer surface portion of the at least one blade. In some embodiments, the at least one radially-extending electrically conductive member is formed of a metal material.

In some embodiments, the at least one blade of the at least one rotary device comprises a plurality of blades, and the at least one rotary electrode emitter of each of the plurality of blades comprises at least one radially-extending electrically conductive member that extends proximate to the back trailing edge. In some embodiments, the at least one rotary electrode emitter further comprises at least one electrically conductive projection that extends away from the back trailing edge of the at least blade in a direction extending from the front leading edge to the back trailing edge, the at least one radially-extending electrically conductive member and the at least one electrically conductive projection being electrically coupled.

In some embodiments, the at least one rotary electrode emitter comprises at least one electrically conductive projection that extends away from the back trailing edge of the at least blade in a direction extending from the front leading edge to the back trailing edge. In some such embodiments, the at least one electrically conductive projection extends from the back edge of the at least one blade. In some other such embodiments, the at least one electrically conductive projection extends from one of the top surface and the bottom surface proximate to the back edge of the at least one blade. In some other such embodiments, the at least one electrically conductive projection comprises a plurality of radially spaced electrically conductive projections. In some other such embodiments, the at least one electrically conductive projection is positioned proximate to the tip of the at least one blade and distal to the hub portion. In some such embodiments, the at least one electrically conductive projection is radially spaced from the tip of the at least one blade at least 10% the radial length of the at least one blade. In some other such embodiments, the at least one electrically conductive projection is formed of a metal material.

In some embodiments, the at least one blade of the at least one rotary device comprises a plurality of blades, and the at least one rotary electrode emitter of each of the plurality of blades comprises at least one electrically conductive projection that extends away from the back trailing edge of the at least blade in a direction extending from the front leading edge to the back trailing edge.

In some embodiments, the at least one counter electrode comprises an opposite polarity as compared to the at least one rotary electrode emitter. In some embodiments, the at least one counter electrode comprises a solid member. In some embodiments, the at least one counter electrode comprises a member with a plurality of through holes. In some embodiments, the at least one counter electrode is positioned adjacent a side of the at least one rotary device adjacent one of the top side, the bottom side and the tips of the plurality of blades thereof.

In some embodiments, the at least one counter electrode forms a hollow ring or cylinder with an integral void, and the at least one rotary device is positioned within the internal void. In some embodiments, the at least one counter electrode forms a shape that is selected from the group comprising: a regular polygonal shape, a simple polygonal shape, an equilateral polygonal shape, an equiangular polygonal shape, a convex polygonal shape, a concave polygonal shape, an isogonal polygonal shape, a triangular shape, a quadrilateral shape, a tetragonal shape, a rectangular shape, a square shape, a rhombus shape, a pentagonal shape, a hexagonal shape, a heptagonal shape, an octagonal shape, a nonagonal shape, and a decagonal shape, and combinations thereof.

In some embodiments, the hub portion comprises a shaft extending along the axis of rotation, and the shaft comprises an electrically conductive portion that is electrically coupled with the at least one rotary electrode emitter. In some such embodiments, the hub portion is rotatably mounted on the shaft such that the at least one rotary device rotates on the shaft about the axis of rotation. In some other such embodiments, the hub portion is fixedly coupled with the shaft such that rotation of the at least one rotary device about the axis of rotation rotates the shaft about the axis of rotation.

In some embodiments, the at least one rotary device comprises at least one propeller configured to convert rotational motion thereof about the axis of rotation in the first direction into thrust. In some such embodiments, the at least one propeller comprises a positive angle of attack with respect to the front leading edge and the first direction. In some other such embodiments, the front edge, the back edge and the top and bottom surfaces of the at least one blade of the at least one propeller form an airfoil shape in cross-section.

In some other such embodiments, the system is an aerial system, and the at least one propeller is configured such that the thrust is at least partially directed in a vertically downward direction toward a ground surface. In some such embodiments, the system is configured such that the thrust is of sufficient power to lift the system off of the ground surface.

In some embodiments, the at least one propeller is configured such that the thrust is at least partially directed in a horizontal direction. In some such embodiments, the system is configured such that the thrust is of sufficient power to translate the system along the horizontal direction along a ground surface.

In some embodiments, the system further comprises a housing defining an enclosure extending at least partially about the at least one rotary device, the enclosure containing the fluid in which the at least one rotary device rotates about the axis of rotation. In some such embodiments, the atmosphere comprise one or more gas. In some such other embodiments, the atmosphere comprises one or more liquid.

In some embodiments, the spaced relationship between the at least one rotary device and the at least one counter electrode is a fixed spaced relationship. In some embodiments, the spaced relationship between the at least one rotary device and the at least one counter electrode is an adjustable spaced relationship. In some embodiments, the second terminal is directly electrically coupled to the at least one counter electrode. In some embodiments, the second terminal and the at least one counter electrode are electrically coupled to a common ground.

In another aspect, the present disclosure provides an electrohydrodynamic (EHD) rotary system. The EHD rotary system comprises at least one rotary device configured convert rotational motion thereof about an axis of rotation in a first direction into thrust, the at least one rotary device comprising a hub portion, an axis of rotation, and at least one blade extending radially from the hub portion to a tip thereof, the a least one blade comprises a front leading edge, a back trailing edge and top and bottom surfaces that extend between the front and back edges. The EHD rotary system also comprises at least one rotary electrode emitter, the at least one rotary electrode being electrically conductive and coupled to at least one blade of the at least one rotary device proximate to the back edge thereof. The EHD rotary system further comprises at least one counter electrode, the at least one counter electrode being electrically conductive and positioned proximate to the at least one rotary device in a spaced relationship. The EHD rotary system also comprises an electrical system comprising a voltage source including a first terminal that is electrically coupled to the at least one rotary electrode emitter and a second terminal that is electrically coupled to the at least one counter electrode, the voltage source comprising an electric potential difference between the first and second terminals that generates corona discharges from the at least one rotary electrode that form flows of ionic wind emanating therefrom that rotate the at least one rotary device about the axis of rotation in the first direction.

In some embodiments, the at least one rotary electrode emitter comprises at least one radially-extending electrically conductive member extending proximate to the back trailing edge and at least one electrically conductive projection that extends away from the back trailing edge of the at least blade in a direction extending from the front leading edge to the back trailing edge, the at least one radially-extending electrically conductive member and the at least one electrically conductive projection being electrically coupled. In some such embodiments, the at least one blade of the at least one rotary device comprises a plurality of blades, and the at least one rotary electrode emitter of each of the plurality of blades comprises the at least one radially-extending electrically conductive member and the at least one electrically conductive projection.

In some embodiments, the front edge, the back edge and the top and bottom surfaces of the at least one blade form an airfoil shape in cross-section.

In another aspect, the present disclosure provides a method of electrohydrodynamically rotating a rotary system. The method comprises obtaining a rotary device. The rotary device comprise a hub portion, an axis of rotation, at least one blade extending radially from the hub portion to a tip thereof, at least one rotary electrode emitter being electrically conductive and coupled to the at least one blade of the at least one rotary device proximate to the back edge thereof, and at least one counter electrode. The a least one blade comprising a front leading edge, a back trailing edge and top and bottom surfaces that extend between the front and back edges. The at least one counter electrode being electrically conductive and positioned proximate to the at least one rotary device in a spaced relationship. The method further comprising generating corona discharges from the at least one rotary electrode that form flows of ionic wind emanating therefrom that rotate the at least one rotary device about the axis of rotation in a first direction by applying an electric potential difference of relatively high voltage of a voltage source to the at least one rotary electrode emitter and the at least one counter electrode.

In some embodiments, the at least one rotary device comprises at least one propeller and the at least one blade comprises at least one propeller blade that converts the rotational motion of the at least one propeller about the axis of rotation in the first direction into thrust.

BRIEF DESCRIPTION OF THE DRAWINGS

These and other features, aspects, and advantages of the present disclosure will become better understood when the following detailed description is read with reference to the accompanying drawings. The accompanying drawings, which are incorporated into and form a part of the specification, illustrate one or more embodiments of the present inventions and, together with the description, explain the principles of the inventions. The drawings are only for the purpose of illustrating one or more embodiment of the inventions and are not to be construed as limiting the inventions. Accordingly, non-limiting and non-exhaustive features will be described with reference to the following figures, wherein like reference numerals refer to like aspects throughout the various figures.

The drawings may or may not be drawn to scale. In accordance with standard practice, various features may not be drawn to scale. For example, dimensions of the various features may be arbitrarily increased or reduced for clarity of discussion purposes. Illustrative dimensions/relative dimensions, sizes, positions, orientations and other physical aspects are provided in the figures, which may be altered as appropriate. The drawings are only for purposes of illustrating embodiments and are not to be construed as limiting the disclosure.

Figure 1:
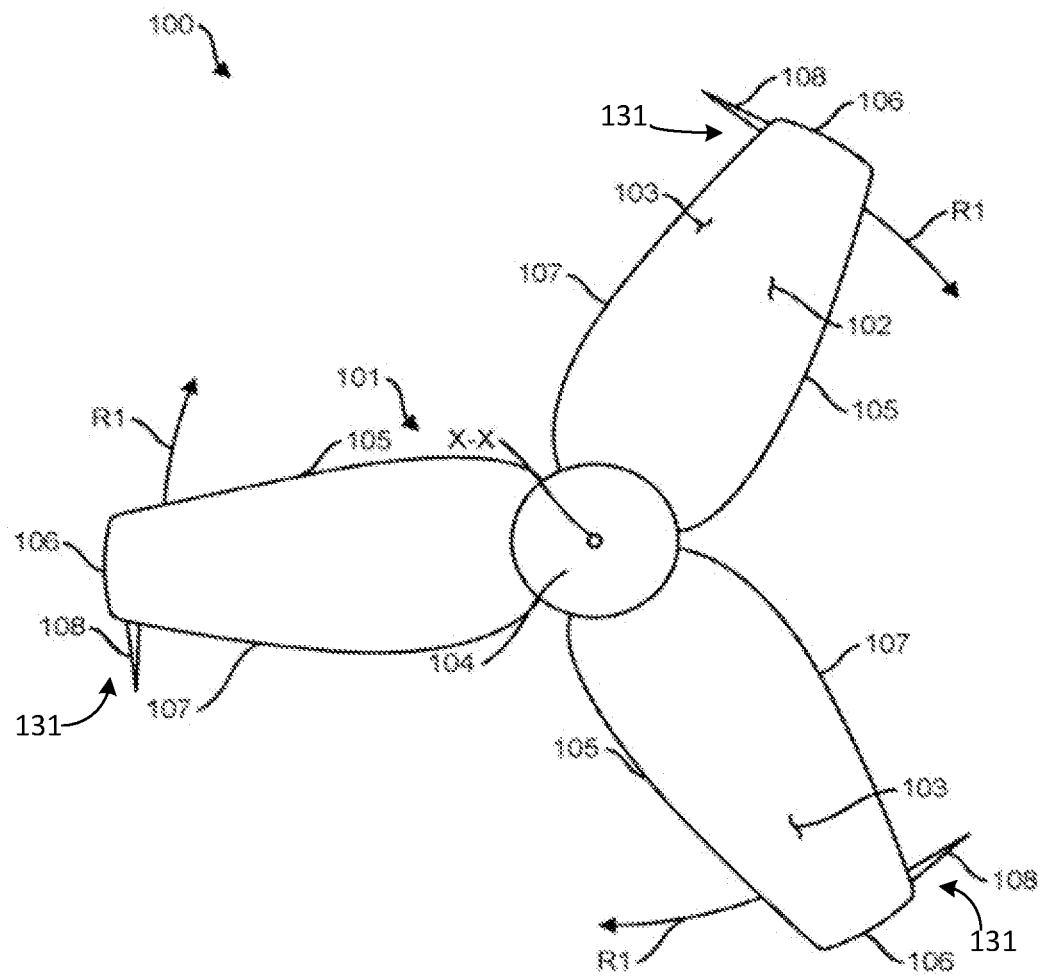
FIG. 1 illustrates a top view of an exemplary embodiment of a propeller for an electrohydrodynamic (EHD) rotary system in accordance with an aspect of the present disclosure.

While embodiments shown in these figures accomplish various aspects and objects of the inventions, it is appreciated that it may not be possible to clearly show each element and aspect of the invention in a single figure, and as such, multiple figures are presented to separately illustrate the various details of the inventions in greater clarity. Similarly, not every embodiment need accomplish all advantages of the present inventions.

DETAILED DESCRIPTION

Aspects of the present disclosure and certain examples, features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the relevant details. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure.

The details of the inventions will now be discussed in relation to the accompanying drawings so as to enable one skilled in the art to practice the present inventions. These, and other aspects and objects of the present inventions, will be better appreciated and understood when considered in conjunction with the following description and the accompanying drawings. It should be understood, however, that the following description, while indicating embodiments of the present inventions and numerous specific details thereof, is given by way of illustration and not of limitation. The drawings and following description are exemplary of various aspects of the inventions and are not intended to narrow the scope of the appended claims.

Many changes and modifications may be made within the scope of the present invention without departing from the spirit thereof and the invention includes all such modifications. This invention includes all such modifications.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to an "example" are not intended to be interpreted as excluding the existence of additional examples that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any examples that "comprises," "has," "includes" or "contains" one or more step or element possesses such one or more step or element, but is not limited to possessing only such one or more step or element. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

As used herein, the term "propeller" and grammatical variants thereof includes any rotor, fan, airscrew, screw propeller, screw, turbine, or other similar spinning device, and is used synonymously herein. The term "airfoil" is used herein synonymously with "hydrofoil" and "aerofoil," and refers to any cross-sectional shape of a wing, blade or sail that produces an aerodynamic force of thrust and/or lift when moved through a fluid (gaseous and/or liquid). As used herein, the terms blade and wing are used herein synonymously when referring to a propeller.

In one aspect, the present disclosure provides electrohydrodynamic (EHD) rotary systems and related methods that generate thrust from a propeller via EHD-generated rotation of the propeller for propulsion. In some embodiments, the systems and methods provide sufficient thrust to physically move a device or apparatus housing or including the systems. For example, in some embodiments, an EHD rotary system and corresponding method may be fully incorporated into an aerial vehicle (e.g., an unmanned aerial vehicle (UAV), a rotorcraft (e.g., a drone, a helicopter, etc.), a fixed wing aircraft, an aerostat or a combination thereof), and the EHD rotary system and corresponding method may rotate at least one propeller thereof at a sufficient rotational speed and/or torque such that sufficient thrust and/or lift is provided to liftoff and/or fly of the aerial device above a ground surface. As another example, in some embodiments, an EHD rotary system and corresponding method may be fully incorporated into a land-based vehicle (e.g., a wheeled vehicle, hovercraft, boat, sled, etc.), and the EHD rotary system and corresponding method may rotate at least one propeller thereof at a sufficient rotational speed and/or torque such that sufficient thrust and/or lift is provided to translate the vehicle along a ground surface.

The EHD rotary systems and related methods of the present disclosure may thereby be incorporated into any propeller-based air/fluid-flow apparatus as a replacement/substitute of or a supplement to, the power source of the apparatus (i.e., the torque/rotation generating system, such as an electric motor, combustion engine, etc.). For example, the EHD rotary systems and related methods of the present disclosure may be utilized with any fan, pump, turbine, jet, propeller, rotor or turbine. There are a multitude of practical applications based on the EHD-induced torque and/or rotational motion embodied in EHD rotary systems and related methods of the present disclosure.

The EHD rotary systems and related methods of the present disclosure apply an electrode voltage to at least one rotary electrode of a rotary device that generates a relatively strong inhomogeneous or non-uniform electric field between the rotary electrode and a nearby stationary counter electrode above the corona onset, which becomes very intense near one or more relatively sharp edge of the rotary electrode. The field accelerates the free electrons in the region which leads to an avalanche process and local breakdown. More free electrons and ions are created producing local cold plasma. As the ionization region is proximate to the one or more relatively sharp edge of the rotary electrode, ions of the opposite polarity of the electrode quickly reach the electrode and are neutralized. Electrons have a much higher mobility than ions, and they clear the air-gap fast, leading to the formation of drifting space charge of opposite polarity to the emitting rotary electrode. Moving ions impart momentum to neutral molecules in a coupling mechanism, and move in the electric field towards the opposite electrode (e.g., from a rotary electrode to the counter electrode). This generates an EHD flow, also known as corona discharge, corona wind, ionic wind or electric wind (these terms are used synonymously herein). It is noted that in the corona discharges, diffusion and magnetic effects play a relatively minor role in the ion flow.

In some embodiments, the EHD rotary systems and related methods of the present disclosure achieve rotational motion of a propeller (or other rotary device) via EHD thrust and torque generated from the ion flow resulting in the strong inhomogeneous or non-uniform electric field between the rotary electrode on a propeller (or other rotary device) and the nearby stationary counter electrode above the corona onset. When the ionic wind is produced, EHD thrust is generated from the action of the electric field on the space charge and as a result of momentum conservation for the air-electrode system, as discussed above. If the electric field E and spatial charge density ρ distributions in the volume v are known, the thrust magnitude, $T_{EHD}$, may be calculated as $T_{EHD} = \int \rho E dv$. However, potentially more realistically, the EHD thrust may also be modeled as $$T_{EHD} = I \frac{kd^n}{\mu},$$

where I is the corona current; d is the distance between the corona point and the counter electrode, k is the constant of proportionality, n is a constant coefficient and y is the average mobility of ions.

In the EHD rotary systems and related methods of the present disclosure, the EHD thrust may generate torque and rotational motion relative to the axis of rotation of the propeller (or other rotary device), which may be characterized by $J_p\ddot{\theta}+C\dot{\theta}^N=\tau_{EHD}-\tau_{F_f}$, where $J_p$ is the moment of inertia of the propeller, $\ddot{\theta}$ is the angular acceleration, C is a constant; $\dot{\theta}$ is the angular speed; $\tau_{EHD}$ is the torque associated to the EHD generated thrust; $C\dot{\theta}^N$ is the torque associated to the drag forces, N=1 for laminar flow and N=2 for turbulent flow; $\tau_{F_f}$ is the torque associated to the frictional forces between the propeller and the axial support on/in which the propeller rotates. However, it is noted that thrust may not identically correspond to the EHD force due to the presence of drag and also due to contact frictional forces. During the motion of the propeller or other rotary device of the EHD rotary systems and related methods of the present disclosure, the rotational motion relative to the axis of rotation of the propeller may be characterized by $I_s\ddot{\theta}=\tau_{EHD}-\tau_{F_v}-\tau_{F_f}$, where $I_s$ is the moment of inertia of the propeller, $\ddot{\theta}$ is the angular acceleration, $\tau_{EHD}$ is the torque associated to the EHD generated thrust, $\tau_{F_v}$ is the torque associated to the viscosity forces, $\tau_{F_f}$ is the torque associated to the frictional forces between the propeller and the axial support.

In some embodiments, the rotational induced friction/resistance between the propeller and the axial support may be minimal. In such embodiments, the $\tau_{F_f}$ may be neglected relative to $\tau_{EHD}$ and $\tau_{F_v}$. Further, viscosity/drag forces (Fv) may depend, at least partially, on the linear speed of the propeller, profile/cross-sectional shape of the propeller, the density of the fluid in which the propeller rotates and/or the viscosity of the fluid in which the propeller rotates. In some embodiments, the fluid parameters may be considered constant, and the cross-sectional shape/profile of the propeller does not change in time, and thus the viscosity forces relationship may be reduced to $F_v=Cv^k$, where C, k are constants for a given linear speed. Consequently, the associated torque may also depend on $v^k$.

In some embodiments of the EHD rotary systems and related methods of the present disclosure, the generated frictional and drag torque acting on the propeller or other rotary device may be small relative to the EHD generated thrust and torque for relatively low speeds or angular velocities (which may depend, at least in part, upon the diameter or size of the propeller/rotary device). Hence, in some embodiments, at the start of the rotational motion of the propeller or other rotary device, the dominant torque applied to the propeller or other rotary device may be due to the constant EHD thrust. Accordingly, a constant angular acceleration (i.e., a linear increase of the angular velocity with time) of the propeller or other rotary device may be experienced during such a time period during this region.

In some embodiments of the EHD rotary systems and related methods of the present disclosure, the variation of the angular velocity (ω) of the propeller or other rotary device may linearly increase at the beginning of its rotation/motion, irrespective of the high voltage (above the corona onset) applied to the rotary electrode. The linear portion in the variation of the angular velocity ω(t) may provide acceleration α as $$\alpha = \ddot{\theta} = \frac{d\omega(t)}{dt}.$$

In some embodiments, the slope of the linear region linear portion in the variation of the angular velocity is the angular acceleration, and therefore the constant torque of EHD thrust may also be determined as $\tau_{EHD}=I_s\alpha_l$ where $\alpha_l$ is the slope of the linear portion of variation of the angular velocity ω(t).

In some embodiments, the propeller or other rotary device comprises a plurality of projections extending outwardly from each blade and/or a plurality of blades thereof proximate to a back edge of the blades. In some such embodiments, the projections may extend along an axis thereof that is tangent to the rotational pathway of the projection. In another embodiment, the projections may be angled radially outward from the axis of rotation as they extend from the trailing edge of a blade.

In some embodiments with the projections being oriented tangent to the rotational/angular pathway thereof, the EHD generated torque with respect to the rotational axis may be expressed as $\tau_{EHD}=\Sigma_{i=1}^N(F_{EHD,t}^i R_i)$, where $F_{EHD,t}^i$ is the tangential thrust per projection-pair number i, $R_i$ is the effective radius corresponding to the $F_{EHD,t}^i$ and N is the total number of projection pairs used in the propeller or other rotary device.

Also, in some embodiments of the EHD rotary systems and related methods of the present disclosure, the angular velocity of the propeller or other rotary device may stabilize over time to a maximum value (i.e., to terminal angular velocity). In some embodiments, a period of nonlinear increase in angular velocity of the propeller/rotary device and a period of linear increase in angular velocity of the propeller/rotary device may occur between the period of initial motion angular rotation/motion and the terminal angular velocity. In some such embodiments, the period of nonlinear increase in angular velocity of the propeller/rotary device may comprise a transitory regime from the start of the motion of the propeller/rotary device to the steady state/terminal velocity of the propeller/rotary device.

In some embodiments of the EHD rotary systems and related methods of the present disclosure, the EHD thrust generated at/on the rotary electrode of the propeller or other rotary device may be proportional or otherwise related to the corona current and/or the current applied to rotary emitter electrode (e.g., depending upon the particular configuration. However, it is noted that in some other embodiments, the EHD thrust generated at/on the rotary electrode of the propeller or other rotary device may not be proportional to the corona current and/or the current applied to rotary emitter electrode.

The EHD thrust may be derived theoretically by $$F_{EHD} = I\frac{kd}{\mu},$$

where I is the corona current, d is the distance between the emanating point/position of the corona and the counter electrode, k is a constant of proportionality, while μ is the average mobility of ions. It is noted that this theoretical derivation may be valid for a uniform electric field, which may not be the case for embodiments of the EHD rotary systems and related methods of the present disclosure. For example, it has been shown that $$F_{EHD} = I\frac{kd^n}{\mu},$$

with "n" being a constant smaller than unity, may be a more realistic or accurate theoretical derivation of the EHD thrust. In such a revised theoretical derivation, the thrust per unit of power may be expressed as $$\eta = \frac{F_{EHD}}{IV} = \frac{A}{V},$$

with A being a constant when geometrical and physical conditions are not changed. As such, the EHD rotary systems and related methods of the present disclosure may comprise a tradeoff between efficiency of thrust generation and applied voltage.

It is noted that corona current is generally accepted to follow a quadratic variation with the voltage above the corona onset of I=KV(V−V$_o$), where V$_o$ stands for corona onset voltage and K is a proportionality constant. Thereby, thrust may follow a quadratic variation with the applied voltage for constant d of F$_{EHD}$=BV(V−V$_o$), where B is the new resulting constant.

Figure 2:
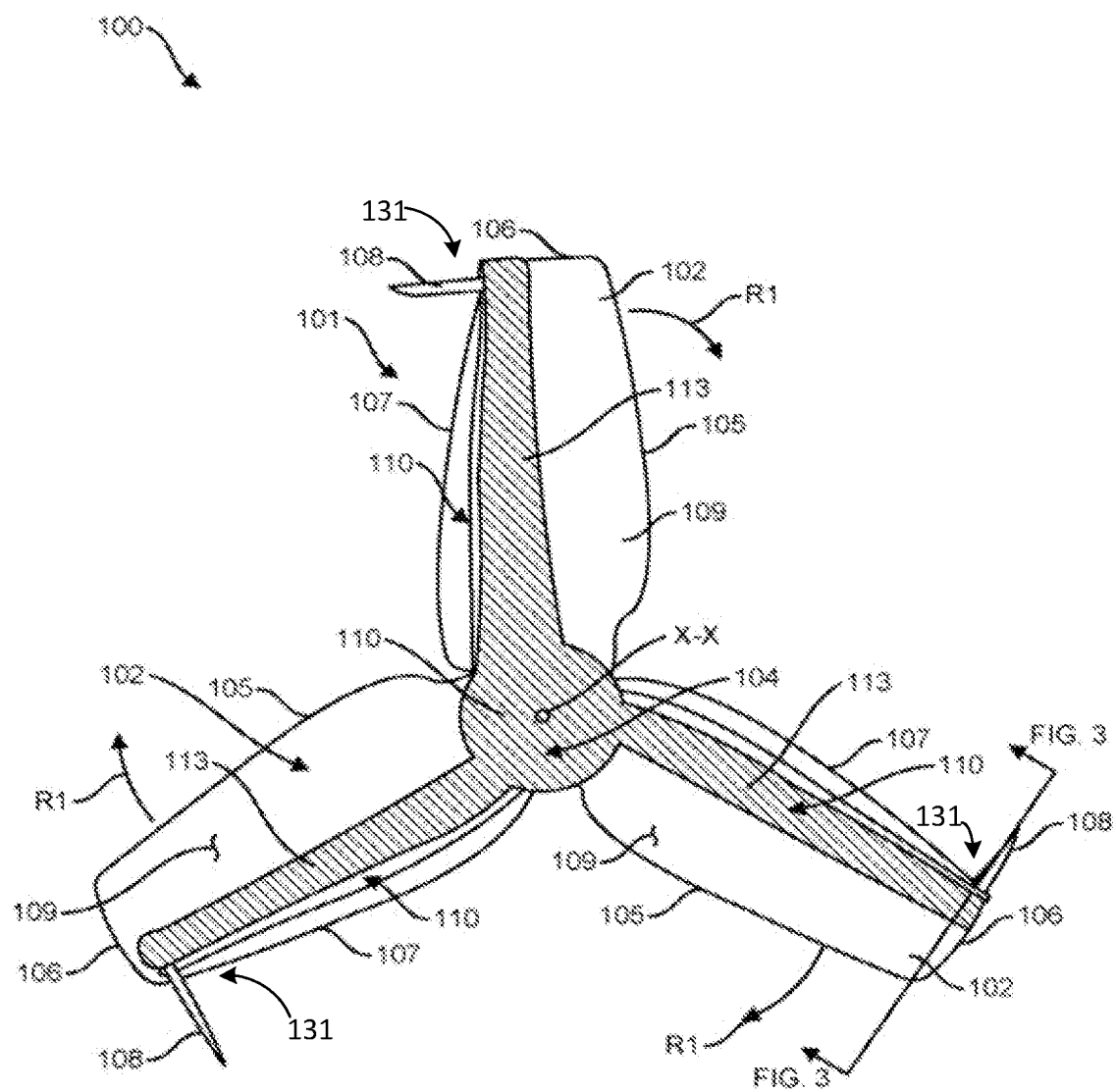
FIG. 2 illustrates a bottom view of the propeller of FIG. 1.

FIGS. 1-5 illustrate an exemplary EHD rotary system 100 and related method according to the present disclosure that utilizes a propeller 101 as the rotary device. As shown in FIGS. 1 and 2, the propeller 101 includes a hub portion 104 and a plurality of blade portions 102 extending radially from the hub portion 104. The propeller 101 is configured to rotate about an axis X-X of rotation that extends through the hub portion 104. In this way, the hub portion 104 may physically support and arrange the blade portions 102, at least partially, and allow the propeller 101, as a whole, to rotate about the axis X-X.

Figure 5:
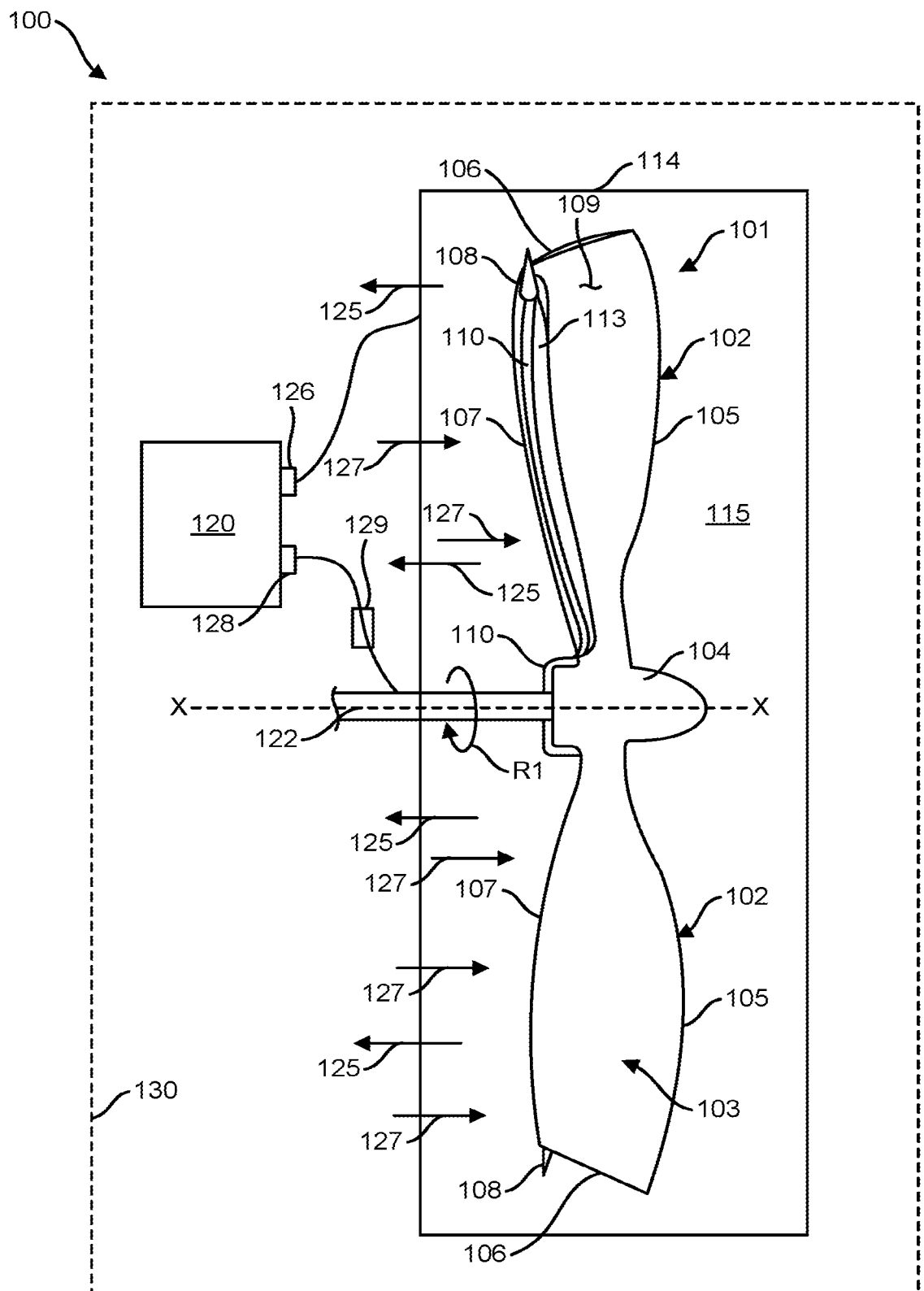
FIG. 5 illustrates a side view of the EHD rotary system of FIG. 4.

As shown in FIGS. 2 and 5, in some embodiments the hub portion 104 may include a circular or cylindrical aperture or hole that is aligned with the axis X-X that is configured to accepts a shaft portion 122 therein, and potentially therethrough. The hub portion 104 may thereby rotate on (directly or indirectly) the shaft portion 122 about the axis X-X. The hub portion 104 (and thereby the propeller 101 as a whole) may be axially fixed along the length of the shaft portion 122 along the axis X-X, or may be able to axially slide or otherwise axially translate along the length of the shaft portion 122 along the axis X-X. In such embodiments, the EHD thrust is utilized to rotate the propeller 101 with respect to the shaft portion 122 about the axis X-X. In some other embodiments, the shaft portion 122 may be rigidly or fixedly coupled to the hub portion 104. In such embodiments, the EHD thrust is utilized to rotate the propeller 101 and the shaft portion 122 about the axis X-X. The shaft portion 122 may define an axis that is aligned with, or comprises, the axis X-X of rotation of the propeller 101.

In the illustrated exemplary embodiment, the propeller 101 includes three blade portions 102. However, the propeller 101 may include only a single blade portion 102, a pair of blade portions 102, or three or more blade portions 102. The plurality of blade portions 102 may be shaped, sized and otherwise configured identically to each other, or the blade portions 102 may vary in at least one physical characteristic. The blades 102 may be formed of any relatively rigid and strong material, such as wood, plastic, polymer, foam, alloy, metal, glass, ceramic, composite, fiber reinforced composite, carbon-fiber, fiberglass, or any combination thereof. In some embodiments, the blades 102 may comprise an electrically insulative or non-conductive (or semiconductor) material. In some embodiments, the blades 102 may comprise a material and/or portion with an electrical resistivity of greater than or equal to 0 Ω·m at 20 degrees Celsius, or greater than or equal to 100 Ω·m at 20 degrees Celsius, greater than or equal to 500 Ω·m at 20 degrees Celsius.

As shown in FIGS. 1 and 2, the plurality of blade portions 102 extend radially from the hub portion 104 to tips or free ends 106 thereof. The plurality of blade portions 102 are circumferentially or angularly arranged about the axis X-X. As shown in FIGS. 1 and 2, the plurality of blade portions 102 may be circumferentially or angularly spaced from each other about the axis X-X. As also shown in FIGS. 1 and 2, each blade 102 includes an outer surface that includes a front leading edge 105, a back trailing edge 107, a top surface 103 that extends between the front and back edges 105, 107, and a bottom surface 109 that extends between the front and back edges 105, 107.

It is noted that the front leading edge 105 and/or the back trailing edge 107 may comprise the junction of, or a surface extending between, the top and bottom edges 103, 109. The term "edge" is used herein with respect to the front and back edges 105, 107 to refer to either configuration. The front edge 105 may comprise the outer edge or surface portion of a respective blade 102 that is positioned furthest, or travels first, in a first angular or rotational direction R1 about the axis X-X. The front edge 105 is thereby the foremost edge of that blade 102 that first contacts or passes through the fluid about the propeller 101 as the propeller 101 rotates about the axis X-X in the first rotational direction R1.

The back edge 107 may comprise the outer edge or surface portion of a respective blade 102 that is positioned furthest in a second angular or rotational direction R2 about the axis X-X that opposes the first rotational direction R1, or travels last in the first rotational direction R1 about the axis X-X. The back edge 107 is thereby the trailing edge of that blade 102 that last contacts or passes through the fluid about the propeller 101 as the propeller 101 rotates about the axis X-X in the first rotational direction R1.

Figure 3:
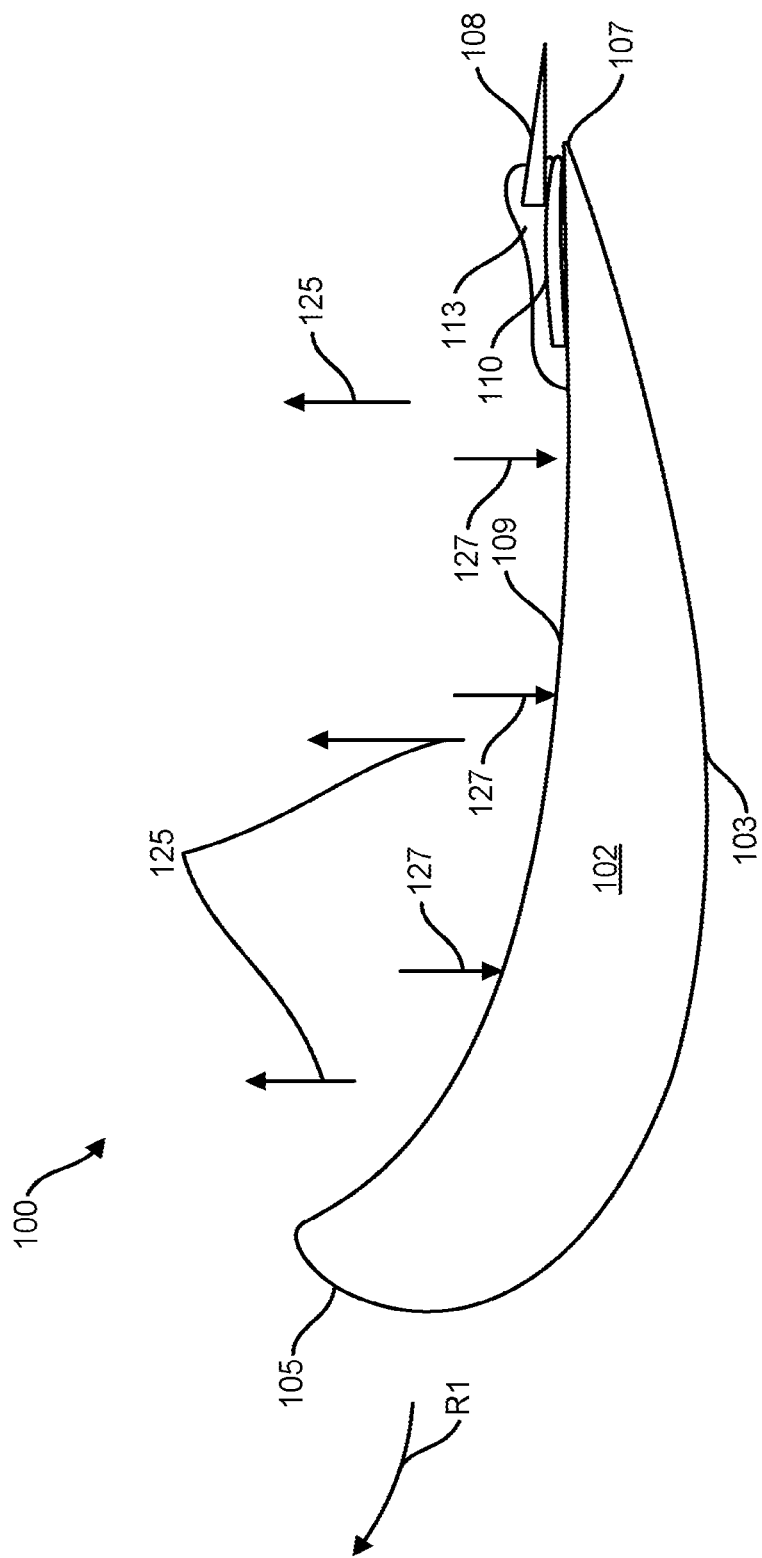
FIG. 3 illustrates a cross-sectional view of a blade of the propeller of FIGS. 1 and 2.

As shown in FIGS. 3 and 5, the blades 102 of the propeller 101 may be oriented to include an angle of attack that converts rotational motion of the blades 102 about the axis X-X in the first rotational direction R1 through a fluid into an aerodynamic/hydrodynamic force including a thrust force or flow component acting away from the bottom surface 109 of the blades 102 perpendicular to the first rotational direction R1 (or a plane defined by the path of the blades) and/or parallel (in all directions) to the axis of rotation X-X. The thrust force component 125 may comprise all of the aerodynamic/hydrodynamic force or a portion of the aerodynamic/hydrodynamic force (typically a portion), depending, at least partially, upon the configuration and/or orientation of the blades 102, for example. As the blades 102 rotate about the axis X-X in the first rotational direction R1 through a fluid (e.g., a gas and/or a liquid), the blades 102 and the angle of attack thereof are configured to deflect and force the fluid away from the bottom side 107 thereof in a flow of the fluid (i.e., the thrust component force 125).

According to Newton's third law, as shown in FIGS. 3 and 5, the fluid (gaseous or liquid fluid) surrounding the at least one propeller 101 or other rotary device must exert an equal and opposite force to the thrust force component 125 on the blades 102, referred to herein as a lift force component 127. The blades 102 of the propeller 101 may thereby be oriented to include an angle of attack and/or airfoil shape that converts rotational motion of the blades 102 about the axis X-X in the first rotational direction R1 through a fluid into an aerodynamic/hydrodynamic force comprising the thrust force component 125 and an aerodynamic/hydrodynamic reaction force comprising the lift force component 127 acting against the bottom surface 109 of the blades 102 perpendicular to the first rotational direction R1 (or a plane defined by the path of the blades) and/or parallel (in all directions) to the axis of rotation X-X (i.e., equal and opposite to the thrust component force 125). The lift force component 127 may comprise all of the reaction aerodynamic/hydrodynamic force or a portion of the aerodynamic/hydrodynamic force, depending, at least partially, upon the configuration and/or orientation of the blades 102, for example.

The propeller 101 or other rotary device may be oriented such that the thrust force component 125 and the lift force component 127 extend vertically, horizontally or at an angle between vertical and horizontal. The desired use of the thrust force component 125 and the lift force component 127 may dictate, at least partially, the configuration of the propeller 101 and the orientations of the thrust force component 125 and the lift force component 127. For example, an aerial device may include the exemplary EHD rotary system 100 with the propeller 101 configured such that the thrust force component 125 and the lift force component 127 are oriented about vertically to achieve liftoff of the aerial device via the lift force component 127.

As another example, an aerial device may include the exemplary EHD rotary system 100 with the propeller 101 configured such that the thrust force component 125 and the lift force component 127 are oriented about horizontal to translate the device horizontally in the air and/or to achieve liftoff via airfoil-shaped wings. As yet another example, a land-based device may include the exemplary EHD rotary system 100 with the propeller 101 configured such that the thrust force component 125 and the lift force component 127 are oriented about horizontal to translate the device horizontally in across a ground surface. In a further example, a fan or ventilation device may include the exemplary EHD rotary system 100 with the propeller 101 configured such that the thrust force component 125 and the lift force component 127 are oriented with respect to a portion of the device or another apparatus or device to create a flow of a fluid (e.g., air) over or from the portion of the device or the other apparatus or device (e.g., for cooling or heating). In another example, a pump device may include the exemplary EHD rotary system 100 with the propeller 101 configured such that the thrust force component 125 and the lift force component 127 are oriented with respect to a housing to create a flow of a fluid (e.g., a liquid) through or from the housing.

In some such embodiments, as shown in FIG. 3, the front edge 105, the back edge 107, the top surface 103 and the bottom surface 109 of the blades 102 of the propeller 101 may form an airfoil shape (with an angle of attack) in cross-section that more efficiently produces the thrust force/flow 125 and lift force 127 as compared a non-airfoil cross-sectional shape. In some other embodiments, the front edge 105, the back edge 107, the top surface 103 and the bottom surface 109 of the blades 102 of the propeller 101 may not form an airfoil shape, but rather include an angle of attack that forms the thrust force/flow 125 and lift force 127 via rotation of the propeller 101 in the first rotational direction R1. For example, the top and/or bottom surfaces 103, 109 may be flat/planar, and may potentially extend parallel to each other. The blades 102 of the propeller 101 may include any cross-sectional shape (airfoil or non-airfoil shapes) and any attack angle that is effective in producing an aerodynamic/hydrodynamic force including the thrust component 125 (the component perpendicular to the first rotational direction R1 acting away from the bottom surface 109) and the corresponding lift force component 127 (the component perpendicular to the first rotational direction R1 acting toward and on the bottom surface 109) as the blades 102 rotate in the first rotational direction R1.

Figure 4:
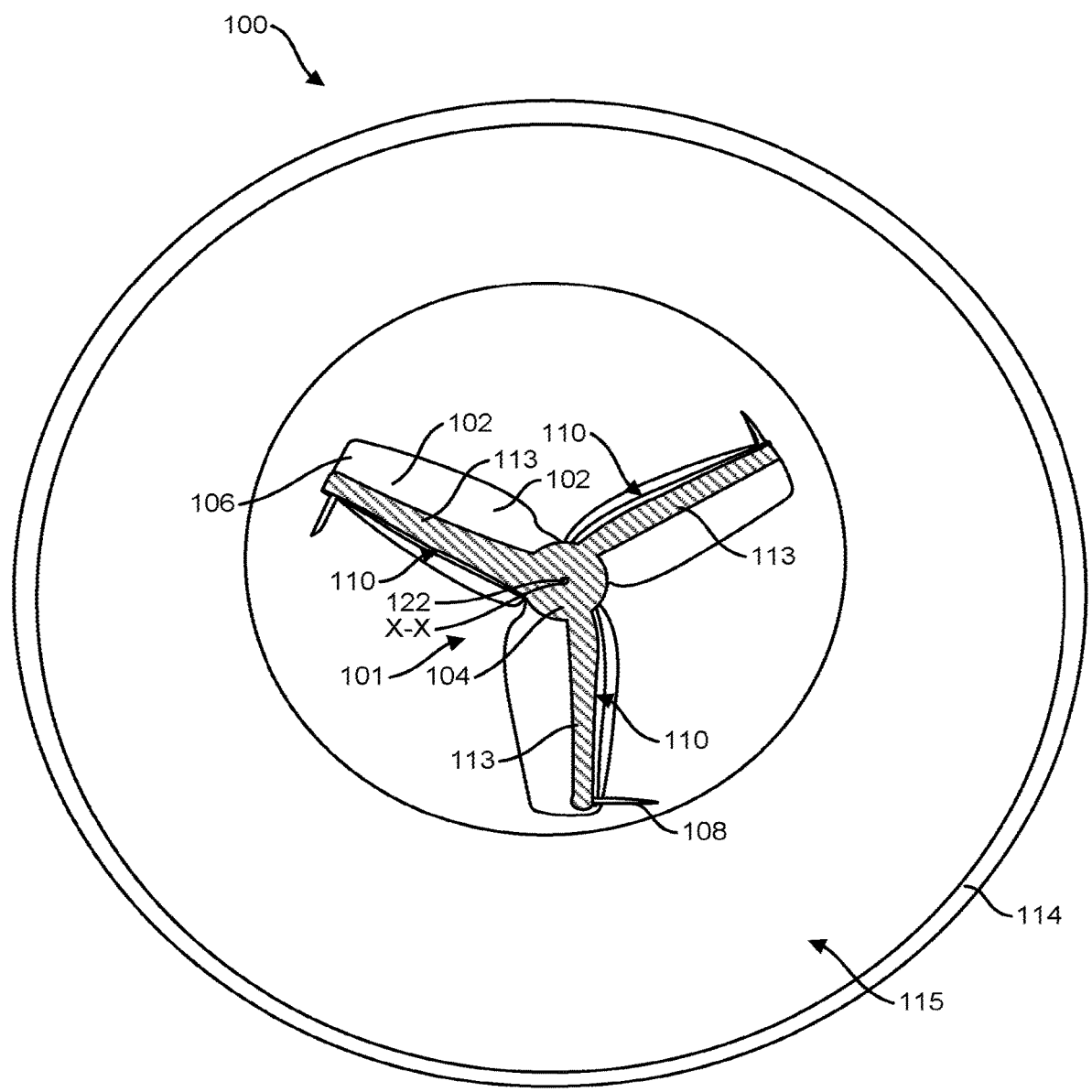
FIG. 4 illustrates a perspective view of an exemplary embodiment of an EHD rotary system utilizing the propeller of FIGS. 1-3 positioned within a hollow cylindrical counter electrode in accordance with an aspect of the present disclosure.

At least one blade 102 of the propeller 101 of the exemplary EHD rotary system 100 includes an exposed, electrically conductive rotary emitter electrode 131 positioned (at least partially) proximate to the back edge 107 thereof. For example, as shown in FIGS. 2-4, at least one blade 102 of the propeller 101 of the exemplary EHD rotary system 100 may include an electrically conductive exposed rotary emitter electrode 131 comprising at least one electrically conductive member 110 extending radially along a blade 102 proximate to the back edge 107 thereof. The at least one conductive member 110 may also extend radially along the hub portion 104, as also shown in FIGS. 2-5. For example, the at least one conductive member 110 may extend from the aperture or shaft 122 and radially along the hub portion 104 and at least one blade 102. As such, the at least one conductive member 110 may be electrically coupled with the shaft portion 122.

The at least one conductive member 110 may comprise a single integral electrically conductive member, or a plurality of electrically coupled separate and distinct electrically conductive members. The at least one conductive member 110 may be configured to carry electrical current and high voltage above corona onset, and generate EHD flow/corona wind in the strong electric field, and thereby EHD thrust to the blade 102 to rotate the propeller 101 about the axis X-X in the first rotational direction R1. In some embodiments, the at least one conductive member 110 may be formed of any electrically conductive or semiconductor material, such as one or more metal (e.g., copper, silver, gold, aluminum, steel, etc.), alloy, semiconductor (e.g., silicon, germanium, gallium arsenide, silicon carbide, ternary compounds, oxides and alloys, arsenic, selenium, tellurium, organic semiconductors (made of organic compounds), etc.) nonmetallic conductor (e.g., graphite, conductive polymers, etc.), composite, conductor, or a combination thereof. In some embodiments, the at least one conductive member 110 may be comprised of one or more film, paint, ink, wire, tape, bar, member (e.g., stiff or flexible member) or any combination thereof.

As shown in FIG. 2, in some embodiments the at least one conductive member 110 of the rotary emitter electrode 131 may extend radially from the hub portion 104 proximate to the back edge 107 of the blade 102 to, or proximate to, the tip 106. In some other embodiments, the at least one conductive member 110 may not extend from the hub portion 104 and proximate to the tip 106. For example, the at least one conductive member 110 may extend radially about two-thirds the radial length of the blade 102, or half the radial length of the blade 102, or about one-third the radial length of the blade 102, or about one-quarter the radial length of the blade 102. As another example, the at least one conductive member 110 may not extend entirely proximate to the back edge 107 of the blade 102. For example, in some embodiments, only a portion of the at least one conductive member 110 may extend along, or be positioned proximate to, the back edge 107 of the blade 102.

In the exemplary embodiment shown in FIGS. 2-5, the at least one conductive member 110 of the rotary emitter electrode 131 of the propeller 101 is affixed to, and extends over, the bottom surface 109 of the blades 102. In other embodiments, as explained further below, the at least one conductive member 110 may be coupled and/or extend only along the back edge 107, along the top surface 103, along the top surface 103 and the back edge 107 itself, along the bottom surface 109 and the back edge 107 itself, along the top and bottom surfaces 103, 109 and not along the back edge 107 itself, or along the top and bottom surfaces 103, 109 and the back edge 107 itself.

At least a portion of the at least one conductive member 110 may or may not be exposed. In the exemplary embodiment shown in FIGS. 2-5, a relatively sharp or narrow outer edge portion of the at least one conductive member 110 proximate to the back edge 107 of the at least one conductive member 110 (and distal to the front edge 105) is exposed. The remainder of the outer surfaces or portions of the at least one conductive member 110 are covered by the blade 102, the hub portion 104 or an electrically insulative material 113 that is configured to prevent the formation of the electric field and/or EHD flow/corona wind from the underlying portions of the at least one conductive member 110. For example, all of the outer surfaces of a portion of the at least one conductive member 110 proximate to the front edge 105 (and distal to the back edge 107) may covered by the blade 102 and/or the electrically insulative material 113. Similarly, all of the outer surfaces of the at least one conductive member 110 coupled to the hub portion 104 may be covered by the hub portion 104 and/or the electrically insulative material 113.

In some embodiments, the electrically insulative material 113 may be formed of any electrically insulative or semiconductor material, such as one or more glass, ceramic, porcelain, dielectric, composite, paper, mica, PTFE, PFA, rubber, wax, oil, asbestos, xylene, ethylbenzene, toluene, cumene, Super Corona Dope™, or and any combination thereof. In some embodiments, the electrically insulative material 113 may be comprised of one or more film, paint, ink, tape, bar, member (e.g., stiff or flexible member) or any combination thereof. In some embodiments, the blade 102, the hub portion 104 and/or the insulative material 113 may include a relatively high dielectric strength to prevent corona formation/generation, such as a dielectric strength of at least about 3,000 V/mm (thickness), at least about 3,500 V/mm, or at least about 4,000 V/mm. In some embodiments, the blade 102, the hub portion 104 and/or the insulative material 113 may include a thickness of at least about ⅓ mm, at least about ½ mm, at least about 1 mm, or at least about 1½ mm.

In some embodiments, a portion of the at least one conductive member 110 proximate to the front edge 105 (and distal to the back edge 107) may be embedded within the blade 102. Similarly, in some embodiments, the portion of the at least one conductive member 110 coupled to the hub portion 104 may be embedded within the hub portion 104. In some alternative embodiments, a portion of the at least one conductive member 110 proximate to the back edge 107 may not be exposed (e.g., covered by the blade 102 and/or the insulative material 113). In some alternative embodiments, the entirety of the at least one conductive member 110 may not be exposed (e.g., completely covered by the blade 102 and/or the insulative material 113). In some other alternative embodiments, the entirety of the outer surface portion of the at least one conductive member 110 of the blade 102 that is not coupled to and/or abutting the blade 102 may be exposed.

As shown in FIGS. 1-5, in some embodiment the electrically conductive exposed rotary emitter electrode of one or more blades 102 of the propeller 101 may comprise at least one electrically conductive projection or protrusion 108 electrically coupled with the at least one conductive member 110. The at least one conductive member 110 may be configured to carry electrical current and high voltage above corona onset from the at least one conductive member 110, and generate EHD flow/corona wind in the strong electric field, and thereby EHD thrust to the blade 102 to rotate the propeller 101 about the axis X-X in the first rotational direction R1. In some embodiments, the EHD flow/corona wind generated by and/or emanating from a blade 102 may be localized or predominately concentrated on/from one or more projection 108 thereof. As such, the EHD thrust to such a blade 102 may be dependent, at least partially, on the one or more projection 108 of the blade 102.

In some embodiments, the at least one conductive member 110 may be formed of any electrically conductive or semiconductor material, such as one or more metal (e.g., copper, silver, gold, aluminum, steel, etc.), alloy, semiconductor (e.g., silicon, germanium, gallium arsenide, silicon carbide, ternary compounds, oxides and alloys, arsenic, selenium, tellurium, organic semiconductors (made of organic compounds), etc.) nonmetallic conductor (e.g., graphite, conductive polymers, etc.), composite, conductor, or a combination thereof.

The projections 108 may be coupled to the blades 102 and extend from the at least one conductive member 110 proximate to the back edge 107, as shown in FIGS. 1-4. A projection 108 may be coupled to and/or extend from only the back edge 107 itself, the top surface 103 proximate to the back edge 107, the top surface 103 and the back edge 107 itself, the bottom surface 109 proximate to the back edge 107, the bottom surface 109 and the back edge 107 itself, the top and bottom surfaces 103, 109 and not the back edge 107 itself, or the top and bottom surfaces 103, 109 and the back edge 107 itself.

The projections 108 may define a relatively sharp end edge, surface or point at the tip or free end thereof. As such, the projections 108 may taper to the tips thereof. In some embodiments, a base portion of a projection 108 opposing the tip thereof may be covered by the insulative material 113 and/or embedded in the blade 102.

The projections 108 extend from proximate to the back edge 107 thereof outwardly past the back edge 107 in a direction opposing the first rotational direction R1 (i.e., a direction extending from the front edge 105 to the back edge 107). In the illustrated exemplary embodiment, the protrusions 108 extend linearly. However, the protrusions 108 may extend nonlinearly (e.g., arcuately, rectilinearly, or a combination thereof). The physical configuration (e.g., cross-sectional shape, path, thickness, distance pas the back edge 107, etc.) may vary, and may depend, at least partially, upon the particular blade 102, propeller 101 or use of the propeller 101, for example.

The projections 108 of the blades 102 of the propeller 101 may be aligned along a plane, which may be normal to the axis X-X of rotation and/or extend in a direction tangential to the hub portion 104. In some embodiments, the one or more projections 108 of the blades 102 are aligned in a tangential or perpendicular (in all directions) direction to the axis of rotation X-X (e.g., the axis of the aperture and/or shaft portion 122) to optimize the EHD torque of the propeller 101 produced by the EHD thrust/corona wind via the projections 108. For example, the one or more projections 108 of the blades 102 may be aligned perpendicularly or relatively perpendicular to the radial direction from the axis X-X of rotation.

While only one projection 108 is depicted per blade 102 of the propeller 101 illustrated in FIGS. 1-5, one or more blades 102 of the propeller 101 may include a plurality of radially spaced projections 108. It is noted that, in some embodiments, the greater the number of projections 108, the greater the EHD thrust (and thereby torque of the propeller 101 and/or shaft 122) the EHD rotary system 100 may be capable of producing. The one or more projections 108 of a blade 102 may be positioned radially anywhere along the blade. In some embodiments, the blades 102 may include at least one projection 108 spaced form the hub portion 104 at least about one-quarter the radial length of the blade 102, or at least about one-third the radial length of the blade 102, or at least about half the radial length of the blade 102, or at least about two-thirds the radial length of the blade 102. In the illustrated embodiment, each blade 102 includes a single projection position about two-thirds of the radial length of the blades 102 from the hub portion 104.

In some embodiments, each projection 108 of a blade 102 may be spaced from the tip 106 thereof and the hub portion 104. For example, in some embodiments, each projection 108 of a blade 102 may be radially spaced from the tip 106 of the blade 102 by at least about 3%, or at least about 5%, or at least about 7%, or at least about 10%, or at least about 15%, or at least about 20%, or at least about 25%, or at least about 30%, or at least about 33%, or at least about 35% of the total radial length of the blade 102 extending from the tip portion 106 thereof to the hub portion 104. Radially spacing each projection 108 of a blade 102 from the tip 106 thereof may unexpectedly increase the EHD thrust/coronal wind generated by the blade 102, as compared to a projection 108 being positioned at or closer to the tip 106. In some embodiments, each projection 108 of a blade 102 may be spaced from the hub portion 104 by at least about 3%, or at least about 5%, or at least about 7%, or at least about 10%, or at least about 15%, or at least about 20%, or at least about 25% of the total radial length of the blade 102 extending from the hub portion 104 to the tip 106 thereof.

As shown in FIGS. 4 and 5, the EHD rotary system 100 further includes at least one electrically conductive counter electrode 114 positioned proximate to the propeller 101. The at least one counter electrode 114 is be configured to form the highly inhomogeneous electric field between the at least one rotary emitter electrode and the at least one counter electrode 114 when the electrical current and high voltage above corona onset is applied to the rotary emitter electrode to generate the EHD flow/corona wind in the electric field, and, thereby, effectuate the EHD thrust to the blades 102 to rotate the propeller 101 about the axis X-X in the first rotational direction R1.

The at least one electrically conductive counter electrode 114 may positioned in any position and orientation in relatively close proximity with respect to the propeller 101, and comprise any two or three dimensional shape, that facilitates or enables formation of the electric field and the EHD flow/corona wind. For example, the at least one counter electrode 114 may be positioned adjacent at least one side of the propeller 101, such as adjacent to the top side 103, the bottom side 109 and/or the tips 106 of the one or more blade 102 of the propeller 101.

The at least one propeller 101 or other rotary device and the at least one counter electrode 114 may be fixedly coupled together such that the spaced relationship therebetween is fixed. In some other embodiments, at least one propeller 101 or other rotary device and the at least one counter electrode 114 may be selectably movably coupled together such that the spaced relationship therebetween can be changes or altered. In some such embodiments, relative movement between the least one propeller 101 or other rotary device and the at least one counter electrode 114 may change the direction of the rotation of the at least one propeller 101 or other rotary device about the axis X-X.

As another example, one or more blade 102 of the propeller 101 may be positioned, at least partially, within at least one electrically conductive counter electrode 114 or between two or more electrically conductive counter electrodes 114 (e.g., between parallel plate electrodes 114) during at least a portion of its rotation about the axis of rotation X-X. For example, as shown in FIGS. 4 and 5, the exemplary illustrated conductive counter electrode 114 of the EHD rotary system 100 comprises a ring or hollow cylindrical shape that extends about the propeller 101 such that the propeller 101 is positioned, at least partially, within an internal void or cavity 115 of the conductive counter electrode 114. In some such embodiments, the propeller 101 may be located centrally within the void 115 of the counter electrode 114 and the counter electrode 114 may extend symmetrically about the axis X-X of rotation. Alternatively, the propeller 101 may be placed outside of the void 115 of the counter electrode 114 (e.g., axially outside of a ring or cylindrical counter electrode 114).

The at least one electrically conductive counter electrode 114 may comprise any two or three dimensional shape that facilitates or enables formation of the electric field and the EHD flow/corona wind. For example, the at least one electrically conductive counter electrode 114 may comprise a two dimensional, three dimensional, solid and/or hollow shape that is selected from the group comprising: a regular polygonal shape, a simple polygonal shape, an equilateral polygonal shape, an equiangular polygonal shape, a convex polygonal shape, a concave polygonal shape, an isogonal polygonal shape, a triangular shape, a quadrilateral shape, a tetragonal shape, a rectangular shape, a square shape, a rhombus shape, a pentagonal shape, a hexagonal shape, a heptagonal shape, an octagonal shape, a nonagonal shape, and a decagonal shape, a cylinder shape, a ring shape, and combinations thereof. It is noted, however, that shapes of the at least one electrically conductive counter electrode 114 that confer a relatively uniform distribution of the electric field between the rotary emitter electrode(s) and the counter electrode 114 may be advantageous as they may facilitate and maintain a relatively strong and constant electric field during rotation at the propeller 101 (e.g., during rotational movement of the at least one rotary emitter electrode of one or more blade 102 of the propeller 101).

The at least one electrically conductive counter electrode 114 may include at least one exposed relatively smooth surface that faces and is positioned in close proximity to the propeller 101, such as in close proximity to the path of the blades 102 including the at least one rotary emitter electrode. The at least one electrically conductive counter electrode 114 may be a solid member or include a plurality of apertures or through holes (e.g., to allow the thrust component flow/force 125 to pass therethrough). In some embodiments, at least the exposed surface portion of the at least one electrically conductive counter electrode 114 proximate to the propeller 101 may be planar or curved (i.e. arcuate).

In some embodiments, the at least one electrically conductive counter electrode 114 may be formed of any electrically conductive or semiconductor material effective informing the string electric field with the at least one rotary emitter electrode of the blades 102 of the propeller 101, such as one or more metal (e.g., copper, silver, gold, aluminum, steel, etc.), alloy, semiconductor (e.g., silicon, germanium, gallium arsenide, silicon carbide, ternary compounds, oxides and alloys, arsenic, selenium, tellurium, organic semiconductors (made of organic compounds), etc.) nonmetallic conductor (e.g., graphite, conductive polymers, etc.), composite, conductor, or a combination thereof.

As shown in FIG. 5, the EHD rotary system 100 further comprises an electrical system 120 that supplies high voltage above corona onset to the one or more rotary emitter electrode of the propeller 101 (or other rotary device) to generate the strong electrical field and the EHD thrust/corona wind to effectuate rotation of the propeller 101 about the axis X-X and, ultimately, thereby generate the lift force component 127 (when the propeller 101 comprises the rotary device). For example, the electrical system 120 that supplies electric potential difference/high voltage above corona onset to the at least one projection 108 and/or the at least one electrically conductive member 110 of at least one blade 102, such as via the shaft portion 122 and/or the portion of the at least one electrically conductive member 110 coupled to the hub portion 104, that generates corona discharges from the at least one projection 108 and/or the at least one electrically conductive member 110 that form flows of ionic wind emanating therefrom that rotate the at least one rotary device about the axis of rotation in a first rotational direction R1.

It is noted that the entirety of the EHD thrust/coronal wind (or the reactionary force thereto) may not act against the at least one blade 102 of the propeller 101 or other rotary device in the first rotational direction R1 (or tangentially thereto, such as normal to the trailing edge 107) (in a plane of the rotation or pathway of the at least one blade 102 about the axis X-X). Rather, a portion of the EHD thrust/coronal wind (or the reactionary force thereto) may be angled within respect to the first rotational direction R1 (or tangentially thereto). For example, the shape/orientation of a blade 102 (e.g., the pitch thereof), and or the physical configuration of the at least one emitter electrode thereof, may be configured such that the EHD thrust/coronal wind (or the reactionary force thereto) comprises a thrust component that extends in the direction of the thrust force/flow component 125 of the propeller 101 and/or a reactionary lift force component that extends in the direction of the lift force component 127 the propeller 101. In this way, the EHD thrust/coronal wind may add an additional lift force component 127 to the propeller 101 that acts against the bottom side 109 of the at least one blade 102 thereof, for example (which may assist in translating a device including the EHD flow system, such as through the air and/or over a ground surface).

The electrical system 120 may be configured to apply a voltage (electric potential difference) to the one or more rotary emitter electrode of the propeller 101 of a positive polarity or a negative polarity. In some embodiments, the electrical system 120 may be configured to apply a voltage (electric potential difference) to the one or more rotary emitter electrode of the propeller 101 and to the one or more counter electrode 114 of opposite polarities. In some other embodiments, the one or more counter electrode 114 (and the electrical system 120) may be grounded (to a common ground). It is noted that the application of negative verse positive polarity electric potential difference to the one or more rotary emitter electrode of the propeller 101 (or other rotary device) (as compared to the one or more counter electrode 114) of an EHD rotary system 100 may generate about the same angular/rotational speed of the propeller 101, but may generate more overall EHD thrust. Further, a larger negative polarity voltage as compared to a positive polarity voltage may be able to be applied to the rotary emitter electrode without breakdown/arcing. Negative polarity voltage applied to the rotary emitter electrode may thereby generate more overall EHD thrust as compared to positive polarity voltage applied to the rotary emitter electrode.

In some embodiments, the corona current in the negative polarity may be larger than in the positive polarity at the same voltage, potentially due, at least in part, to a greater ion mobility and an improved ability to generate larger momentum than in the positive polarity.

The electrical system 120 may comprise any source of electrical energy (e.g., current and voltage) that is electrically coupled to the at least one counter electrode 114 and/or the one or more rotary emitter electrode of the propeller 101 (or other rotary device). For example, in some embodiments the electrical system 120 comprises a battery, a generator, a fuel cell, a solar cell, an electrical grid input line, a supercapacitor, or a combination thereof.

In some embodiments, the electrical system 120 may apply a voltage (electric potential difference) to one or more rotary emitter electrode of the propeller 101 or other rotary device (e.g., to the at least one projection 108 and/or the at least at least one electrically conductive member 110 of at least one blade 102) (and/or potentially to the at least one counter electrode 114) of at least about +/−1 kV, or about +/−2 kV, or about +/−3 kV, or about +/−5 kV, or about +/−10 kV, or about +/−15 kV, or about +/−20 kV, or about +/−25 kV, or about +/−35 kV, or about +/−50 kV, or about +/−75 kV, or about +/−100 kV. The maximum voltage applied by the electrical system 120 may depend, at least partially, upon the particular configuration of the system 100 and the fluid encountered, and is limited to below the voltage (i.e., the breakdown voltage) that causes electrical breakdown or arcing between the or more rotary emitter electrode and the at least one counter electrode 114. It is noted that, in some embodiments, the terminal angular velocity of the rotation of the propeller 101 or other rotary device about the axis X-X may depend, at least partially, (e.g., a fairly linear dependence) with the applied voltage.

For example, as shown in FIG. 5, in some embodiments the electrical system 120 may comprise a voltage source including a first terminal 126 that is electrically coupled to the one or more rotary emitter electrode of the propeller 101 (or other rotary device) that supplies the high voltage above corona onset thereto. As also shown in FIG. 5, the voltage source may also include a second terminal 128 that is electrically coupled to the at least one counter electrode 114. The voltage source thereby includes an electric potential difference between the first and second terminals 126, 128 of a sufficient voltage that generates corona discharges from the at least one rotary emitter electrode that form the flows of ionic wind emanating therefrom that act to rotate the propeller 101 or other rotary device about the axis of rotation X-X in the first rotational direction R1.

In some embodiments, the electrical system 120 may apply an electrical current to one or more rotary emitter electrode of the propeller 101 or other rotary device (e.g., to the at least one projection 108 and/or the at least at least one electrically conductive member 110 of at least one blade 102) (and/or potentially to the at least one counter electrode 114) within the microamps to milliamps range. For example, the electrical system 120 may apply a direct electrical current (DC) to the at least one conductive member 110 and/or the at projection 108 of at least one blade 102 of the propeller 101 or other rotary device. As another example, the electrical system 120 may apply an alternating electrical current (AC) to the at least one conductive member 110 and/or the at projection 108 of at least one blade 102 of the propeller 101 or other rotary device.

As shown in FIG. 5, in some embodiments, the electrical system 120 may include at least one high voltage resistor 129 in series with the one or more rotary emitter electrode of the propeller 101 or other rotary device (e.g., to the at least one projection 108 and/or the at least at least one electrically conductive member 110 of at least one blade 102). In some embodiments (not shown), the electrical system 120 may include the least one high voltage resistor 129 in series with the counter electrode 114. In some embodiments (not shown), the electrical system 120 may include the at least one high voltage resistor 129 in series with the counter electrode 114 and the at least one high voltage resistor 129 in series with the one or more rotary emitter electrode of the propeller 101 or other rotary device. The high voltage resistor 129 may allow for larger voltages to be applied to the one or more rotary emitter electrode of the propeller 101 or other rotary device while keeping the current relatively low or lower, but generate higher rotational speeds and EHD thrust than as compared to when the high voltage resistor 129 is not utilized. In use of such an EHD rotary system 100, when the corona current starts flowing, a voltage drop may occur across the at least one high voltage resistor 129, but the overall voltage between the one or more rotary emitter electrode of the propeller 101 or other rotary device and the counter electrode 114 may be able to be greater than as compared to the system 100 without the at least one high voltage resistor 129, thereby potentially creating a more intense electric field which better accelerates the ions as compared to the system 100 without the at least one high voltage resistor 129. In some embodiments, the voltage applied between the one or more rotary emitter electrode of the propeller 101 and the counter electrode 114 to effectuate EHD flow/corona discharge when the high voltage resistor 129 is utilized may be greater than that compared to when the high voltage resistor 129 is not utilized, potentially thereby creating a greater EHD flow/corona discharge (i.e., greater torque on the propeller 101 or other rotary device). In some embodiments, the at least one high voltage resistor 129 may include an electrical resistance of at least 100 kΩ.

In some alternative embodiments (not shown), the EHD system may include a plurality of propellers 101 or other rotary devices associated with the same shaft portion 122. For example, two or more propellers 101 may independently rotate about, or be affixed to (i.e., rotationally fixed together), a common shaft 122 and be radially or rotationally offset with respect to each other (i.e., the one or more blades 102 of the plurality of propellers 101 may not be angularly aligned about the axis X-X, but rather radially angularly offset about the axis X-X). The rotary emitter electrode of the one or more blades 102 of the plurality of propellers 101 may each be electrically coupled to the shaft portion 122 for receiving the electrical potential (and current) from the power source 120 via the shaft portion 122. The plurality of propellers 101 may also be associated with a common counter electrode 114, such as being positioned within the same cavity 115 of a counter electrode 114.

In some such embodiments, the plurality of propellers 101 may be configured to rotate in the same rotational direction R1 about the axis X-X via the generated EHD flow/corona wind (and produce the thrust force/flow component 125 and the reactionary lift force component 127 in the same directions). In some other such embodiments, the plurality of propellers 101 may be configured to rotate in opposing rotational directions R1, R2 about the axis X-X via the generated EHD flow/corona wind but produce the thrust force/flow components 125 and the reactionary lift force components 127 thereby in the same directions, which may beneficially provide angular momentum compensation. For example, one or more pairs of propellers 101 of the plurality of propellers 101 may be configured to rotate about, or be affixed to, a common shaft 122 and rotate in opposing rotational directions R1, R2 about the axis X-X via the generated EHD flow/corona wind but produce the thrust force/flow components 125 and the reactionary lift force components 127 thereby in the same directions.

In some other alternative embodiments (not shown), the EHD system may include a plurality of axially-adjacent propellers 101 or other rotary devices associated with the same shaft portion 122, with at least one of the propellers 101 configured as the counter electrode 114 (i.e., a counter electrode propeller). The EHD system may thereby be void of a counter electrode 114 other than the at least one counter electrode propeller.

For example, a plurality of propellers 101 (including the at least one counter electrode propeller) may be configured to rotate about, or may be rotationally affixed to, a common shaft 122 and be fixedly radially or rotationally offset with respect to each other (i.e., one or more blades 102 of the plurality of propellers 101 may not be angularly aligned about the axis X-X, but rather radially angularly offset about the axis X-X). The at least one rotary emitter electrode of the one or more blades 102 of the plurality of propellers 101 not comprising the at least one counter electrode propeller may be electrically coupled to the shaft portion 122 for receiving the electrical potential (and current) from the power source 120 via the shaft portion 122. Further, the at least one counter electrode propeller may also be electrically coupled to the electrical potential from the power source 120 via the shaft portion 122, but the at least one counter electrode propeller and the at least one rotary emitter electrode of the one or more blades 102 of the other propeller(s) 101 may not be electrically coupled (i.e., may be electrically isolated). At least one of the propellers 101 could thereby carry the high voltage above corona onset and the at least one counter electrode propeller could carry the ground potential or opposite polarity voltage. The electric field may thereby be generated between the at least one counter electrode propeller and the at least one rotary emitter electrode of the other propeller(s) 101 for the generation of the EHD flow/corona wind (and thereby rotation about the axis X-X), as described above.

The plurality of propellers 101 may be configured such that the EHD flow/corona wind is generated between the at least one counter electrode propeller and the at least one rotary emitter electrode of the other propeller(s) 101 such that the plurality of propellers 101 (including the counter electrode propeller) are rotated about the axis X-X in the first rotational direction.

Figure 6:
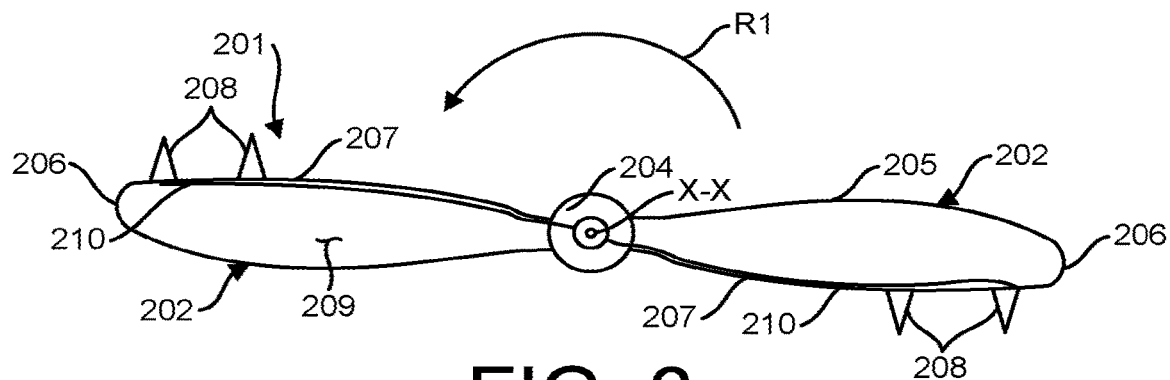
FIG. 6 illustrates a bottom view of an exemplary embodiment of another propeller for an EHD rotary system in accordance with an aspect of the present disclosure.

FIG. 6 illustrates a bottom view of another exemplary propeller 201 for an EHD rotary system in accordance with the present disclosure, such as the EHD rotary system 100 described above with respect to FIGS. 1-5. It is noted that the propeller 201 may be utilized with a shaft portion, at least one counter electrode and an electrical system of an EHD rotary system, as described above.

As shown in FIG. 6, in some embodiments the propeller 201 may include a plurality of blades 202 that each include a rotary emitter electrode. In alternative embodiments, only one blade 202 may include a rotary emitter electrode. The rotary emitter electrode includes a plurality of electrically conductive projections 208 that extend from proximate to the back trailing edge 207 of the blades 202 out past the trailing back edge 207 in a direction extending from the front leading edge 205 to the trailing back edge 207. As shown in FIG. 6, each blade 202 includes a pair of projections 208 that are positioned radially distal to the hub portion 204 and radially proximate to the tip 206, but radially spaced from the tip 206. In some embodiments, the pair of projections 208 may be positioned radially past the midpoint of the radial length of the blade 202 toward the tip 206. For example, at least one of the projections 208 may be positioned at about two-thirds the radial length of the blade 202 from the hub portion 204. The electrically conductive radially-extending member 210 may extend radially from the hub portion 204 to at least the projection 208 positioned closest to the tip 206.

As also shown in FIG. 6, the electrically conductive radially-extending member 210 may radially extend along the radial length of the blade 202 proximate to the back trailing edge 207, such as on the back side 209 of the blade 202 adjacent to the back trailing edge 207. The radially-extending member 210 may be relatively thin or narrow, such as a comprising a wire or wire-like member. As discussed above, the radially-extending member mayor may not be exposed. As also discussed above, the radially-extending member 210 and the projections 208 of each blade 202 are electrically coupled.

Figure 7:
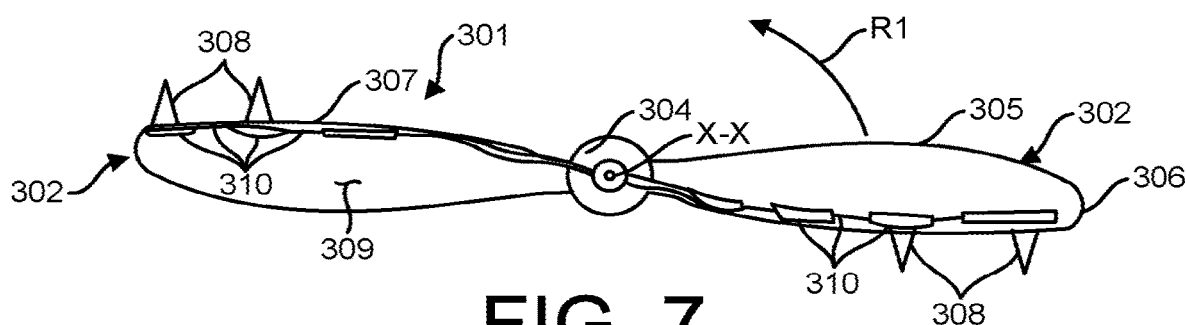
FIG. 7 illustrates a bottom view of an exemplary embodiment of another propeller for an EHD rotary system in accordance with an aspect of the present disclosure.

FIG. 7 illustrates a bottom view of another exemplary propeller 301 for an EHD rotary system in accordance with the present disclosure, such as the EHD rotary system 100 described above with respect to FIGS. 1-5. It is noted that the propeller 301 may be utilized with a shaft portion, at least one counter electrode and an electrical system of an EHD rotary system, as described above.

As shown in FIG. 7, in some embodiments the propeller 301 may include a plurality of blades 302 that each include a rotary emitter electrode. In alternative embodiments, only one blade 302 may include a rotary emitter electrode. The rotary emitter electrode includes a plurality of electrically conductive projections 308 that extend from proximate to the back trailing edge 307 of the blades 302 out past the trailing back edge 307 in a direction extending from the front leading edge 305 to the trailing back edge 307, as shown in FIG. 7. As also shown in FIG. 7, each blade 302 also includes an electrically conductive radially-extending portion 310 that radially extends along the radial length of the blade 302 proximate to the back trailing edge 307, such as on the back side 309 of the blade 302 adjacent to the back trailing edge 307. As shown in FIG. 7, each radially-extending portion 310 may include a plurality of differing portions. The differing portions of the radially-extending portion 310 may differ in size (e.g., differing widths extending in a direction between the front leading edge 305 and the back trailing edge 307) and/or being exposed verse insulated (e.g., via an insulating material, such as being covered by an insulating material applied over the portion(s) or by being embedded within the material of the blade 302).

Figure 8:
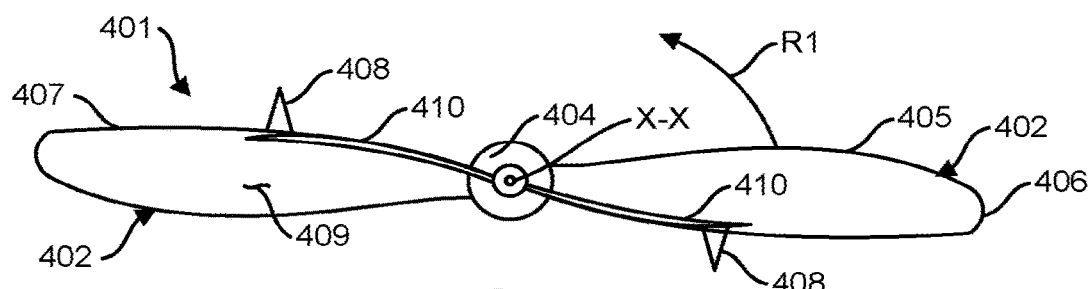
FIG. 8 illustrates a bottom view of an exemplary embodiment of another propeller for an EHD rotary system in accordance with an aspect of the present disclosure.

FIG. 8 illustrates a bottom view of another exemplary propeller 401 for an EHD rotary system in accordance with the present disclosure, such as the EHD rotary system 100 described above with respect to FIGS. 1-5. It is noted that the propeller 401 may be utilized with a shaft portion, at least one counter electrode and an electrical system of an EHD rotary system, as described above.

As shown in FIG. 8, in some embodiments the propeller 401 may include a plurality of blades 402 that each include a rotary emitter electrode. In alternative embodiments, only one blade 402 may include a rotary emitter electrode. As shown in FIG. 8, the rotary emitter electrode of each blade 402 includes an electrically conductive radially-extending portion 410 that radially extends along the radial length of the blade 402 proximate to the back trailing edge 407, such as on the back side 409 of the blade 402 adjacent to the back trailing edge 407. As also shown in FIG. 8, the rotary emitter electrode of each blade 402 includes at least one electrically conductive projection 408 coupled to the radially-extending portion 410 thereof.

The at least one electrically conductive projection 408 extends from proximate to the back trailing edge 407 of the blades 402 out past the trailing back edge 407 in a direction extending from the front leading edge 405 to the trailing back edge 407, as shown in FIG. 8. As shown in FIG. 8, each blade 402 may include one projection 408. In some other embodiments, each blade 402 may include a plurality of projections 408. As also shown in FIG. 8, the at least one projection 408 may be oriented on an angle as it extends out past the trailing back edge 407. For example, as shown in FIG. 8, the at least one projection 408 extends at an angle extending radially outward from the axis X-X as it extends out past the trailing back edge 407 (e.g., toward an outer counter electrode extending about the propeller 401). As another example, the at least one projection 408 may extend at an angle extending radially inward toward the axis X-X as it extends out past the trailing back edge 407 (e.g., away from an outer counter electrode extending about the propeller 401). As another example, the at least one projection 408 may extend at an angle extending from the top surface to the bottom surface 409 of the blade 402, or at an angle extending from the bottom surface 409 to the top surface of the blade 402.

Figure 9:
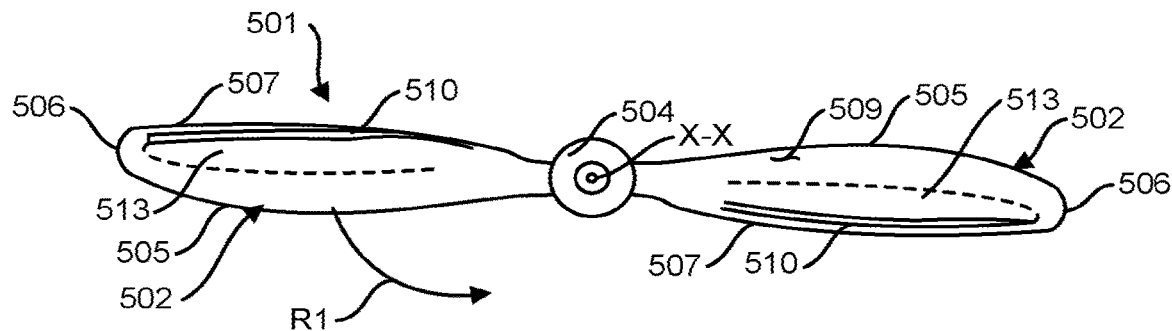
FIG. 9 illustrates a bottom view of an exemplary embodiment of another propeller for an EHD rotary system in accordance with an aspect of the present disclosure.

FIG. 9 illustrates a bottom view of another exemplary propeller 501 for an EHD rotary system in accordance with the present disclosure, such as the EHD rotary system 100 described above with respect to FIGS. 1-5. It is noted that the propeller 501 may be utilized with a shaft portion, at least one counter electrode and an electrical system of an EHD rotary system, as described above.

As shown in FIG. 9, in some embodiments the propeller 501 may include a plurality of blades 502 that each include a rotary emitter electrode. In alternative embodiments, only one blade 502 may include a rotary emitter electrode. As shown in FIG. 9, the rotary emitter electrode of each blade 502 includes an electrically conductive radially-extending portion 510 that radially extends along the radial length of the blade 502 proximate to the back trailing edge 507, such as on the back side 509 of the blade 502 adjacent to the back trailing edge 507.

The propeller 501 may also include an electrically insulative material 513 that extends over or covers the portion of the radially-extending portion 510 that is adjacent or facing the front leading edge 505. In some embodiments, the electrically insulative material 513 may comprise a material that is applied or coupled over the previously-exposed outer surfaces of the portion of the radially-extending portion 510 that is adjacent or facing the front leading edge 505. In some other embodiments, the electrically insulative material 513 may comprise a material of the blade 502 itself such that the portion of the radially-extending portion 510 that is adjacent or facing the front leading edge 505 is embedded within the blade 502.

As also shown in FIG. 9, the portion of the radially-extending portion 510 that is adjacent or facing the back trailing edge 507 is exposed and is void of an electrically conductive projection (coupled to the radially-extending portion 510 thereof). In this way, the rotary emitter electrode of a blade 502 of the propeller 501 may include a partially-exposed radially-extending portion 510 that is relatively flat or smooth such that is it void of any projections extending therefrom past the back trailing edge 507.

Figure 10:
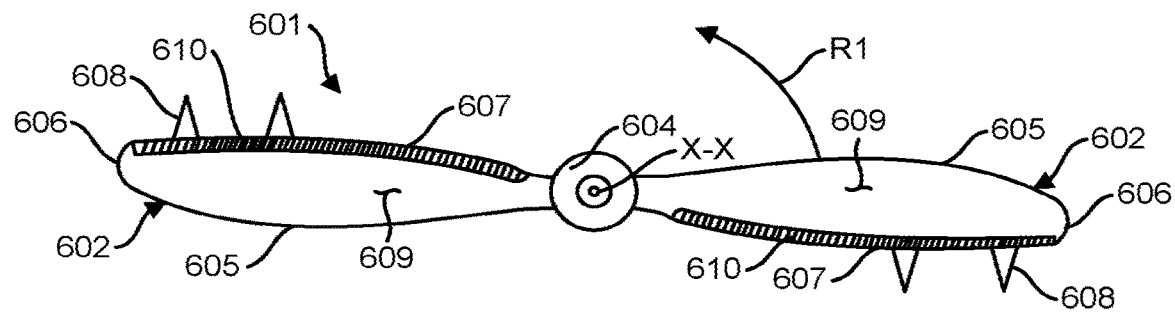
FIG. 10 illustrates a bottom view of an exemplary embodiment of another propeller for an EHD rotary system in accordance with an aspect of the present disclosure.
Figure 11:
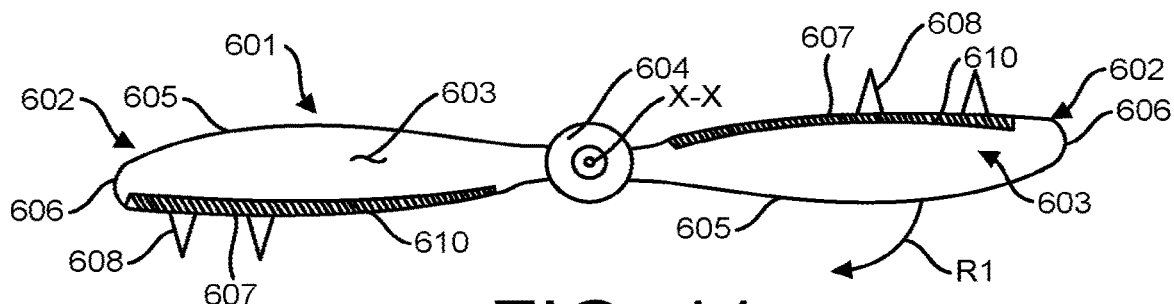
FIG. 11 illustrates a top view of an exemplary embodiment of another propeller for an EHD rotary system in accordance with an aspect of the present disclosure.

FIGS. 10 and 11 illustrate a bottom view of another exemplary propeller 601 for an EHD rotary system in accordance with the present disclosure, such as the EHD rotary system 100 described above with respect to FIGS. 1-5. It is noted that the propeller 601 may be utilized with a shaft portion, at least one counter electrode and an electrical system of an EHD rotary system, as described above.

As shown in FIGS. 10 and 11, in some embodiments the propeller 601 may include a plurality of blades 602 that each include a rotary emitter electrode. In alternative embodiments, only one blade 602 may include a rotary emitter electrode. The rotary emitter electrode of each blade 602 includes an electrically conductive radially-extending portion 610 that radially extends along the radial length of the blade 602 proximate to the back trailing edge 607, as shown in FIGS. 10 and 11. As also shown in FIGS. 10 and 11, the radially-extending portion 610 extends along the back trailing edge back trailing edge 607, along the back side 609 of the blade 602 adjacent to the back trailing edge 607, and along the top side 603 of the blade 602 adjacent to the back trailing edge 607. In this way, the radially-extending portion 610 may wrap or over the back trailing edge 607 and partially onto/over the back side 609 of the blade 602 and the top side 603 of the blade 602. In some other embodiments, the radially-extending portion 610 may not extend over the back side 609 of the blade 602 and/or the top side 603 of the blade 602.

Figure 12:
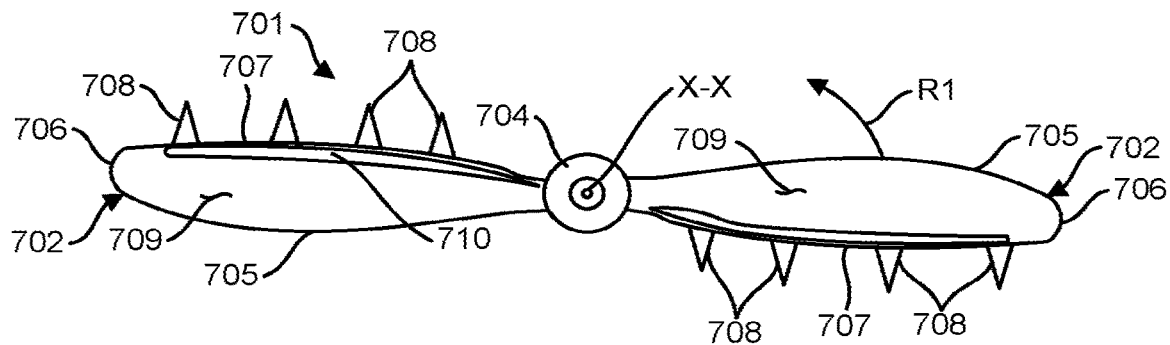
FIG. 12 illustrates a bottom view of an exemplary embodiment of another propeller for an EHD rotary system in accordance with an aspect of the present disclosure.

FIG. 12 illustrates a bottom view of another exemplary propeller 701 for an EHD rotary system in accordance with the present disclosure, such as the EHD rotary system 100 described above with respect to FIGS. 1-5. It is noted that the propeller 701 may be utilized with a shaft portion, at least one counter electrode and an electrical system of an EHD rotary system, as described above.

As shown in FIG. 12, in some embodiments the propeller 701 may include a plurality of blades 702 that each include a rotary emitter electrode. In alternative embodiments, only one blade 702 may include a rotary emitter electrode. As shown in FIG. 12, the rotary emitter electrode of each blade 702 includes an electrically conductive radially-extending portion 710 that radially extends along the radial length of the blade 702 proximate to the back trailing edge 707, such as on the back side 709 of the blade 702 adjacent to the back trailing edge 707.

The rotary emitter electrode of each blade 702 includes a plurality of radially-spaced electrically conductive projection 708 coupled to the radially-extending portion 710 thereof. As also shown in FIG. 12, each blade 702 includes four radially-spaced electrically conductive projections 708 coupled to the radially-extending portion 710 thereof. The plurality of projections 708 extend from proximate to the back trailing edge 707 of the blades 702 out past the trailing back edge 707 in a direction extending from the front leading edge 705 to the trailing back edge 707. The plurality of projections 708 are spaced radially from each other and from the hub portion 704 and the tip 706 of the blade 702. In some embodiments, the plurality of projections 708 may be evenly radially spaced from each other. In some other embodiments, the plurality of projections 708 may be unevenly radially spaced from each other. It is noted that each blade 702 may include fewer than four projections 708 or more than four projections 708.

Figure 13:
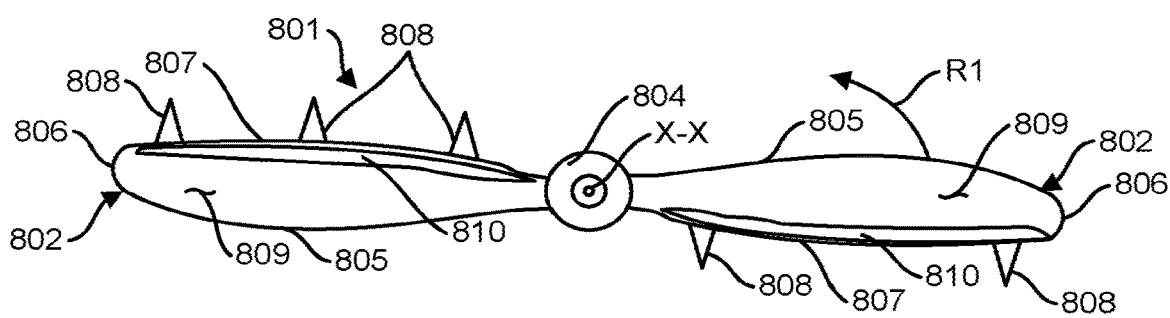
FIG. 13 illustrates a bottom view of an exemplary embodiment of another propeller for an EHD rotary system in accordance with an aspect of the present disclosure.

FIG. 13 illustrates a bottom view of another exemplary propeller 801 for an EHD rotary system in accordance with the present disclosure, such as the EHD rotary system 100 described above with respect to FIGS. 1-5. It is noted that the propeller 801 may be utilized with a shaft portion, at least one counter electrode and an electrical system of an EHD rotary system, as described above.

As shown in FIG. 13, in some embodiments the propeller 801 may include a plurality of blades 802 that each include a rotary emitter electrode. In alternative embodiments, only one blade 802 may include a rotary emitter electrode. As shown in FIG. 13, the rotary emitter electrode of each blade 802 includes an electrically conductive radially-extending portion 810 that radially extends along the radial length of the blade 802 proximate to the back trailing edge 807, such as on the back side 809 of the blade 802 adjacent to the back trailing edge 807.

The rotary emitter electrode of each blade 802 also includes a plurality of radially-spaced electrically conductive projections 808 coupled to the radially-extending portion 810 thereof that extend from proximate to the back trailing edge 807 of the blades 802 out past the trailing back edge 807 in a direction extending from the front leading edge 805 to the trailing back edge 807, as also shown in FIG. 13. As also shown in FIG. 13, the physical configuration of at least one projection 808 of the plurality of projections 808 of one blade 802 may differ from at least one other projection 808 of the plurality of projections 808 of the blade 802. For example, the projections 808 of a blade 802 may differ in materials, lengths (extending from the back trailing edge 807), widths/diameters, tapers and/or orientations with respect to each other. In the illustrated embodiment shown in FIG. 13, the projections 808 of each blade 802 differ in lengths extending from the back trailing edge 807.

As also shown in FIG. 13, the projections 808 of one blade 802 may differ from the projections 808 of another blade 802. For example, one blade 802 may include more projections 808 that another blade 802, as shown in FIG. 13. As another example, one blade 802 may include projections 808 that are differently physically configured than projections 808 of another blade 802. As yet another example, one blade 802 may include projections 808 that are arranged/positioned (e.g., radially positioned and/or spaced) differently than projections 808 of another blade 802.

As noted above, the EHD rotary systems and methods of the present disclosure may be utilized in a variety of differing applications that make use of at least one of the rotation or torque of the rotary device, the thrust force component if a propeller it utilized, and the lift force/flow component if a propeller is utilized. For example, the EHD rotary systems and methods of the present disclosure that generate rotational motion and thrust/lift can be utilized with previously existing aerial, marine and submarine vehicles.

Figure 14:
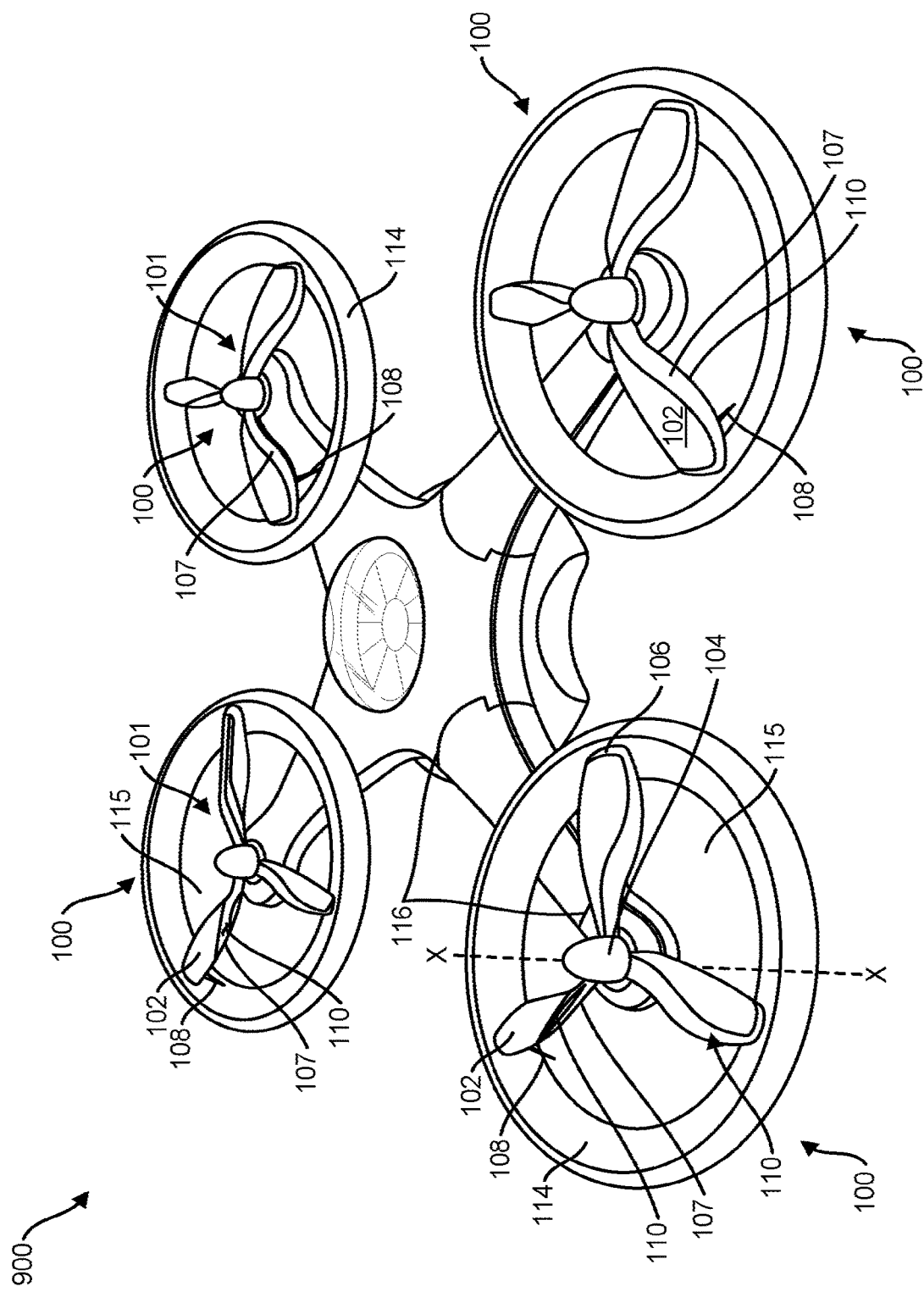
FIG. 14 illustrates an elevational perspective view of an exemplary embodiment of an aerial vehicle utilizing the EHD rotary system of FIG. 4.

In one embodiment, a drone or unmanned aerial vehicle (UAV) 900 may utilize an EHD rotary system and method of the present disclosure to provide lift off and flight of the UAV 900, as shown in FIG. 14. For example, one or more of the EHD rotary systems 100 with propellers 101 described above with respect to FIGS. 1-5 (or an alternative embodiment thereof) may be utilized to form the thrust force component 125 and the lift force component 127 to achieve lift off and flight of the UAV 900. In some embodiments, a plurality of propellers 102 and corresponding counter electrodes 114 may be utilized, and attached to an UAV body or fuselage via one or more articulated joint 116, operable to direct the thrust force component 125, and thereby lift force component 127, created via rotation of the propellers 102 of the UAV during liftoff and flight. In some embodiments, the UAV 900 well may comprise a microdrones, having a weight on the order of about 0.5 gram up to about 500 grams, for example.

Figure 15:
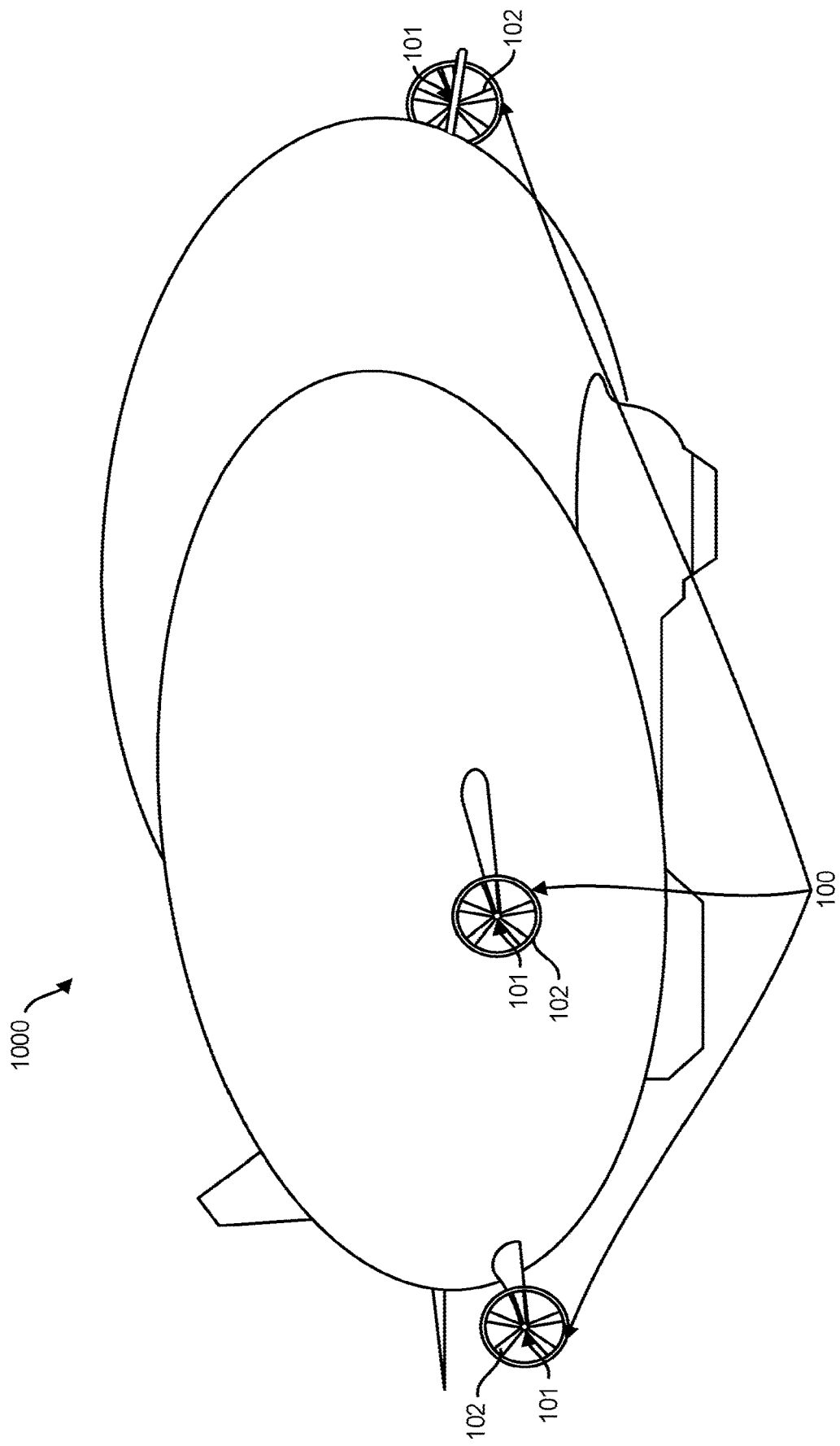
FIG. 15 illustrates an elevational perspective view of another exemplary embodiment of an aerial vehicle utilizing the EHD rotary system of FIG. 4.

FIG. 15 illustrates another aerial vehicle that may utilize an EHD rotary system and method of the present disclosure to provide lift off and/or flight of the vehicle. As shown in FIG. 15, a blimp or lighter-than-air airship 1000 may incorporate one or more of the EHD rotary systems 100 with the propellers 101 described above with respect to FIGS. 1-5 (or an alternative embodiment thereof) may be utilized to liftoff and fly the airship 1000. The airship 1000 may make use of the Archimedes buoyant force from the lighter-than-air balloon thereof, and the EHD forces of the rotary systems 100 may be able to produce a sufficient lift force component 127 relative to the overall weight of the airship 1000 to achieve liftoff and flight thereof. The lift force 127 may also be utilized to fly or translate the airship 1000 through the air after liftoff.

Figure 16:
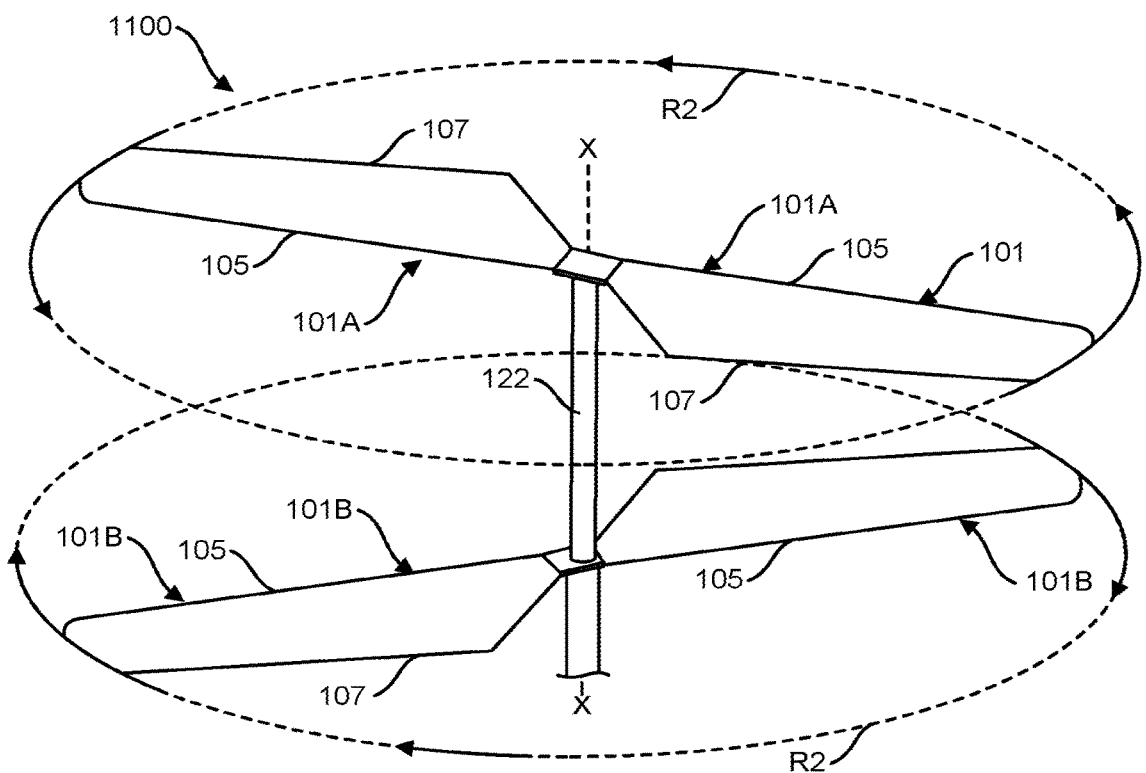
FIG. 16 illustrates an elevational perspective view of an exemplary pair of propellers of another exemplary embodiment of an aerial vehicle utilizing the EHD rotary system of FIG. 4.
Figure 17:
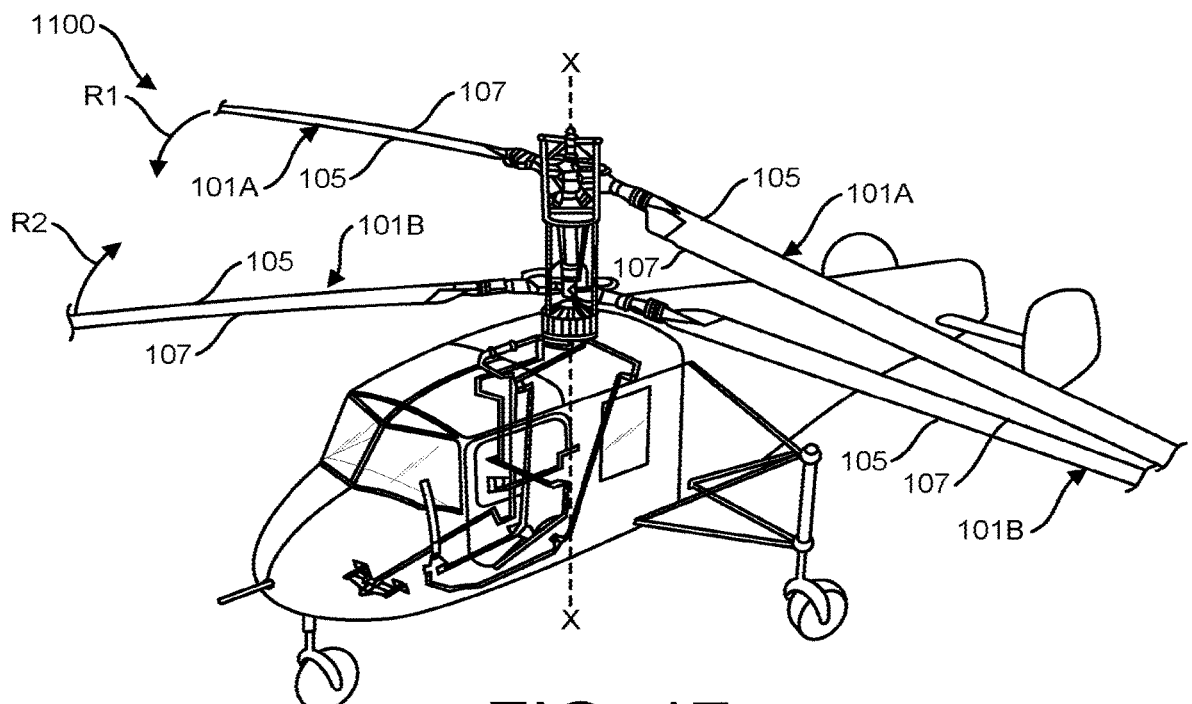
FIG. 17 illustrates an elevational perspective view of the aerial vehicle of FIG. 16.

FIGS. 16 and 17 illustrate another aerial vehicle that may utilize an EHD rotary system and method of the present disclosure to provide lift off and/or flight of the vehicle. As shown in FIGS. 16 and 17, a rotorcraft 1100 (e.g., a helicopter) may incorporate one or more of the EHD rotary systems 100 with the propellers 101 described above with respect to FIGS. 1-5 (or an alternative embodiment thereof) to provide liftoff and fly the rotorcraft 1100. It is noted that the counter electrode of the EHD rotary system is not depicted in FIGS. 16 and 17. The rotorcraft 1100 may make use of the EHD rotary system to rotate a first propeller 101A to provide the thrust force component 125, and thereby the lift force component 127, to achieve liftoff and flight of the rotorcraft 1100.

Further, as shown in FIGS. 16 and 17, the rotorcraft 1100 may also make use of the EHD rotary system to rotate a second propeller 101B to further provide the thrust force component 125, and thereby the lift force component 127, to achieve liftoff and flight of the rotorcraft 1100. In such embodiments, the first and second propellers 101A, 101B may be arranged and otherwise configured such that the rotational directions R1, R2 thereof that create the thrust force component 125 and the lift force component 127 via the EHD thrust/corona wind thereof, are opposing or opposite angular or rotational directions. For example, the orientation/configuration of the first and second propellers 101A, 101B may be opposing, such that the rotational direction R1 of the first propeller 101A that generates the thrust force component 125 and the lift force component 127 (via the EHD thrust/corona wind thereof) is opposite the rotational direction R2 of the second propeller 101B that generates the thrust force component 125 and the lift force component 127 (via the EHD thrust/corona wind thereof). The respective opposing rotational directions R1, R2 of the first and second propellers 101A, 101B may thereby inherently compensate for the opposite angular momentum/torque present in single rotorcraft designs, and may obviate a for a tail rotor (as shown in FIG. 17). In such embodiments, the first and second propellers 101A, 101B may rotate about the shaft portion 122 in the opposing rotational directions R1, R2 as the EHD thrust/corona wind effectuates rotation of the first and second propellers 101A, 101B as compared to rotation/torque of the shaft portion 122 as in traditional rotorcraft 1100.

Figure 18:
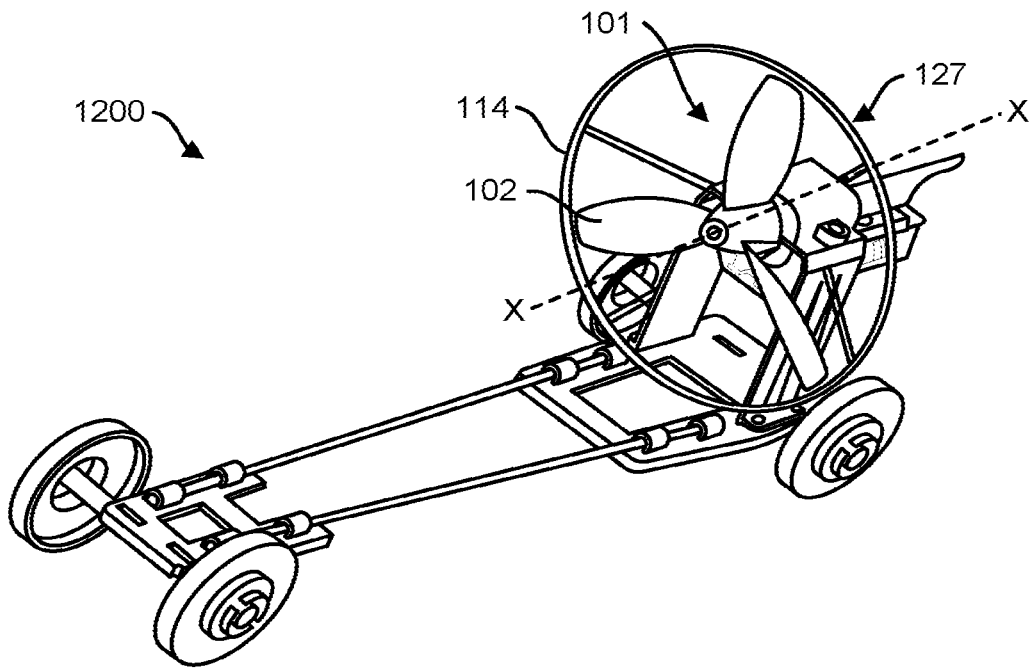
FIG. 18 illustrates an elevational perspective view of an exemplary embodiment of a land-based vehicle utilizing the EHD rotary system of FIG. 4.

FIG. 18 illustrates a land-based vehicle that may utilize an EHD rotary system and method of the present disclosure to power or translate the vehicle along/across a ground surface. As shown in FIG. 18, a wheeled vehicle 1100 may incorporate one or more of the EHD rotary systems 100 with at least one propeller 101 described above with respect to FIGS. 1-5 (or an alternative embodiment thereof) to translate the wheeled vehicle 1100 along/across aground surface via wheels thereof. The wheeled vehicle 1100 may make use of the EHD forces of the EHD rotary systems 100 to rotate the at least one propeller 101 to produce a sufficient lift force component 127 via the at least one propeller 101 relative to the wheeled vehicle 1100 to achieve motion or translation of the wheeled vehicle 1100 along/across a ground surface (via the wheels thereof).

Figure 19:
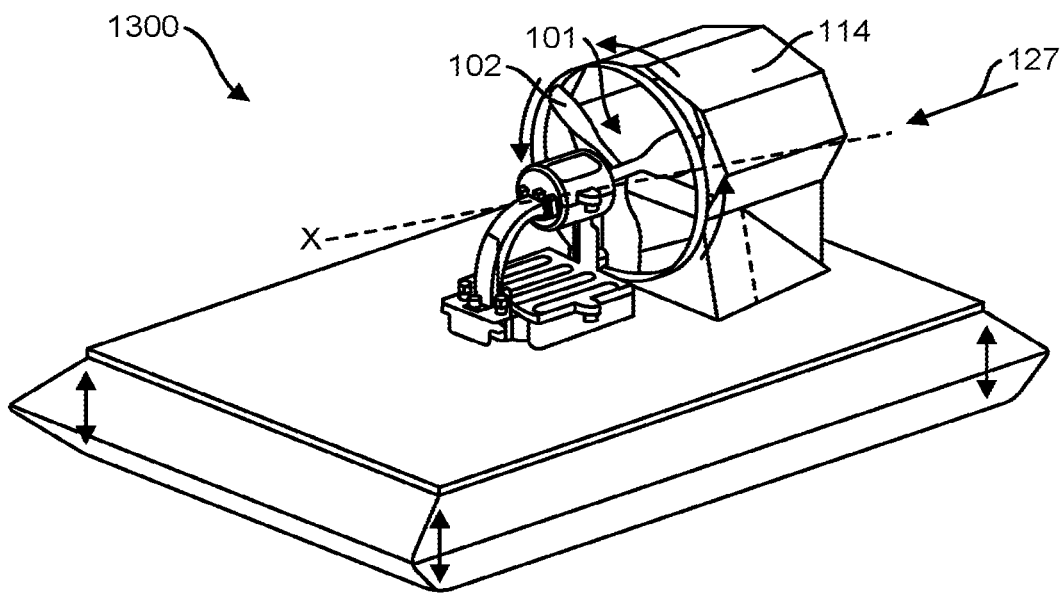
FIG. 19 illustrates an elevational perspective view of an exemplary embodiment of a land-or-water based vehicle utilizing the EHD rotary system of FIG. 4.

FIG. 19 illustrates a land-or-water based vehicle that may utilize an EHD rotary system and method of the present disclosure to power or translate the vehicle along/across a ground and/or water surface. As shown in FIG. 19, a hovercraft 1300 may incorporate one or more of the EHD rotary systems 100 with at least one propeller 101 described above with respect to FIGS. 1-5 (or an alternative embodiment thereof) to pressurize a bladder thereof and/or translate the hovercraft 1300 along/across a ground and/or water surface via the bladder. The hovercraft 1300 may make use of the EHD forces of the EHD rotary systems 100 to rotate the at least one propeller 101 to produce a sufficient thrust force 125 via the at least one propeller 101 to pressurize the bladder, and/or make use of the EHD forces of the EHD rotary systems 100 to rotate the at least one propeller 101 to produce a sufficient lift force component 127 via the at least one propeller 101 relative to the hovercraft 1300 to achieve motion or translation of the hovercraft 1300 along/across a ground and/or water surface (via the bladder thereof).

Figure 20:
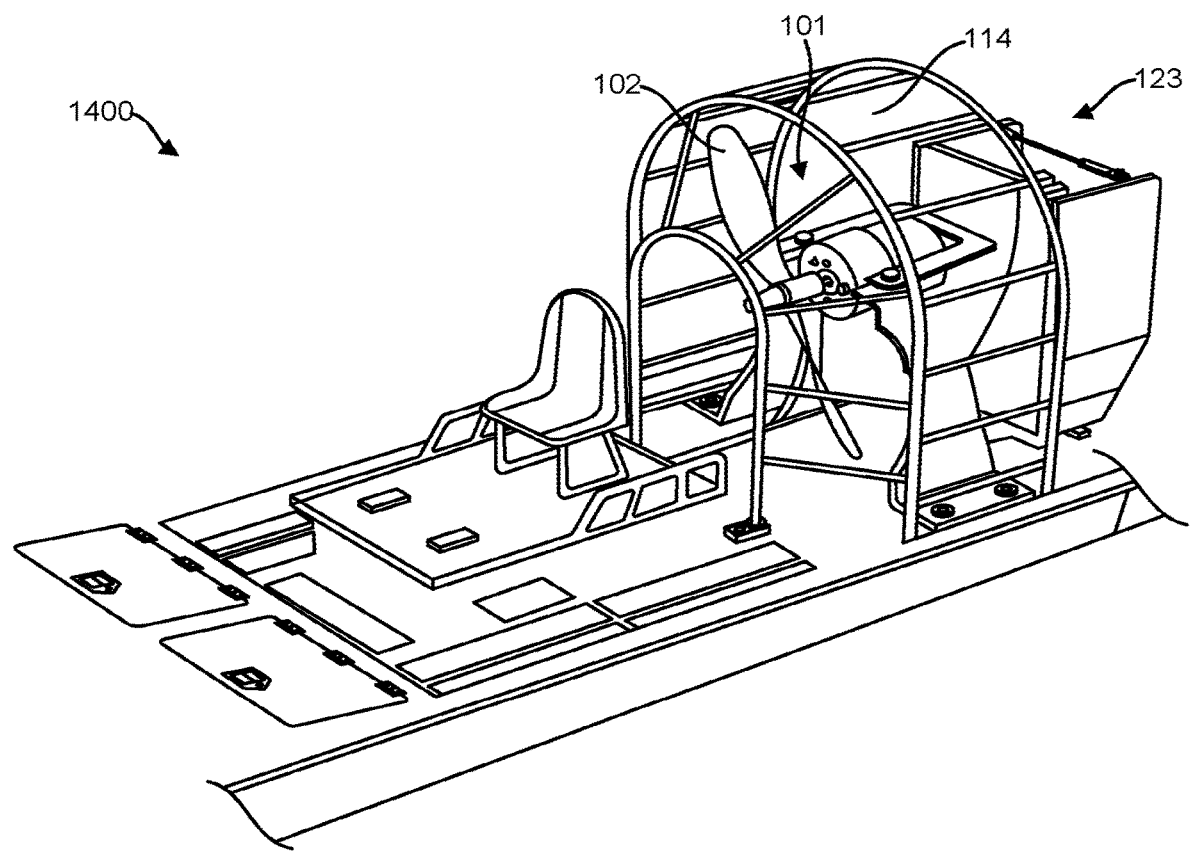
FIG. 20 illustrates an elevational perspective view of an exemplary embodiment of a water-based vehicle utilizing the EHD rotary system of FIG. 4.

FIG. 20 illustrates a water-based vehicle that may utilize an EHD rotary system and method of the present disclosure to power or translate the vehicle along/across a water surface. As shown in FIG. 20, a fan boat 1400 may incorporate one or more of the EHD rotary systems 100 with at least one propeller 101 described above with respect to FIGS. 1-5 (or an alternative embodiment thereof) to translate the fan boat 1400 along/across a water surface via the hull of the fan boat 1400. The fan boat 1400 may make use of the EHD forces of the EHD rotary systems 100 to rotate the at least one propeller 101 to produce a sufficient lift force component 127 via the at least one propeller 101 relative to the fan boat 1400 to achieve motion or translation of the fan boat 1400 along/across a water surface (via the hull thereof).

Figure 21:
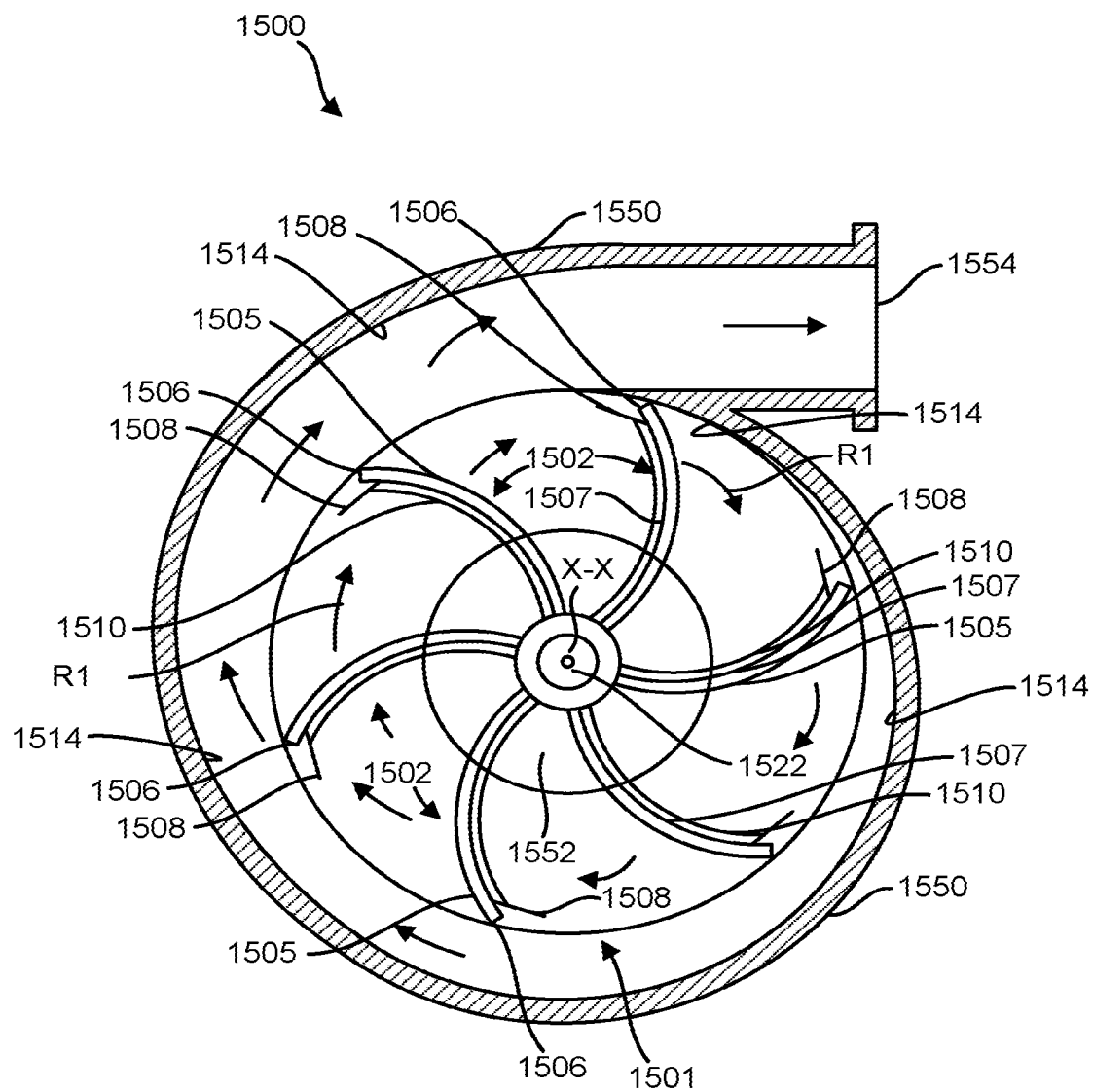
FIG. 21 illustrates a top cross-sectional view of an exemplary embodiment of a pump utilizing the EHD rotary system of FIG. 4.

FIG. 21 illustrates an EHD-driven pump that utilizes an EHD rotary system and method of the present disclosure to power the pump. As shown in FIG. 20, a pump 1500, such as a centrifugal pump, may incorporate an EHD rotary system according to the present disclosure to rotate an impeller or rotor 1501 of the pump 1500 within a housing or casing 1550 to pressurize the fluid and create an outflow of the fluid from the pump 1500 (i.e., translate a fluid through the pump 1500). The casing 1550 may thereby form an enclosure that defines or contains the fluid environment that the impeller 1501 rotates within. As shown in FIG. 21, the impeller 1501 may rotate about an axis of rotation X-X in a first rotational direction R1 to pressurize the fluid and create an outflow of the fluid from the pump 1500. The impeller 1501 may rotate about the axis of rotation X-X in the first rotational direction R1 on/over a shaft portion 1522, or the impeller 1501 may be fixedly coupled to a shaft portion 1522 that is configured to rotate about the axis of rotation X-X in the first rotational direction R1.

As shown in FIG. 21, the impeller 1501 may include a plurality of radially extending vanes 1502 extending outwardly from proximate to an inlet or intake aperture 1552 to tips 1506 thereof, and extend axially from a base plate portion. The inlet 1552 provides for an inlet flow of the fluid into the casing 1550. An interior side of the casing 1550 includes an outlet aperture 1554 that provides for an outlet flow of the pressurized fluid out of the casing 1550. The impeller 1501 (e.g., at least the back side 1507 of the vanes 1502 and the face of the base plate portion) may be formed of an electrically insulative material and/or covered or encased by an electrically insulative material.

The vanes 1502 include front leading side surfaces 1505 that "push" the fluid within the casing 1550 radially during rotation of the impeller 1502 in the first rotational direction R1, and back trailing side surfaces 1505 that trail the leading side surfaces 1505 during rotation of the impeller 1502 in the first rotational direction R1. The back trailing side surfaces 1505 of at least some of the vanes 1502 include at least one electrically conductive rotary emitter electrode. For example, the rotary emitter electrode of the back trailing side surfaces 1505 of the vanes 1502 may include at least one electrically conductive projection 1508 extending outwardly therefrom, and at least one electrically conductive radially-extending member 1510 extending radially from at least the at least one projection 1508 at least partially to the shaft portion 1522.

The impeller transfers rotational energy thereof (generated EHD flow/corona wind, as explained below) that drives the pump 1500 to the fluid being pumped by accelerating the fluid outwards from the axis of rotation X-X. The velocity achieved by the impeller 1502 transfers into pressure when the outward movement of the fluid is confined by the casing 1550.

As shown in FIG. 21, at least a portion of the interior sides of the casing 1550 extending axially about at least a portion of the impeller 1501 about the axis of rotation X-X includes a counter electrode 1514. The counter electrode 1514 may be similarly configured to the counter electrode 114 described above. The impeller 1501 may be similarly configured to the propellers or other rotary devices 101, 201, 301, 401, 501, 601, 701 and/or 801 described above, and/or the vanes 1502 may be similarly configured to the blades 102, 202, 302, 402, 502, 602, 702 and/or 802 described above. In this way, pump 1500 may include an electrical system/voltage source that applies a potential difference between the at least one rotary emitter electrode of the plurality of vanes 1502 and the counter electrode 1514 that generates an electrical field and corona discharges from the at least one rotary electrode that form flows of ionic wind emanating therefrom that rotate the impeller 1501 about the axis of rotation X-X in the first direction R1 to pressurize the fluid within the casing 1550 and from an outlet flow of the fluid from the outlet aperture 1554, as shown in FIG. 21.

Figure 22:
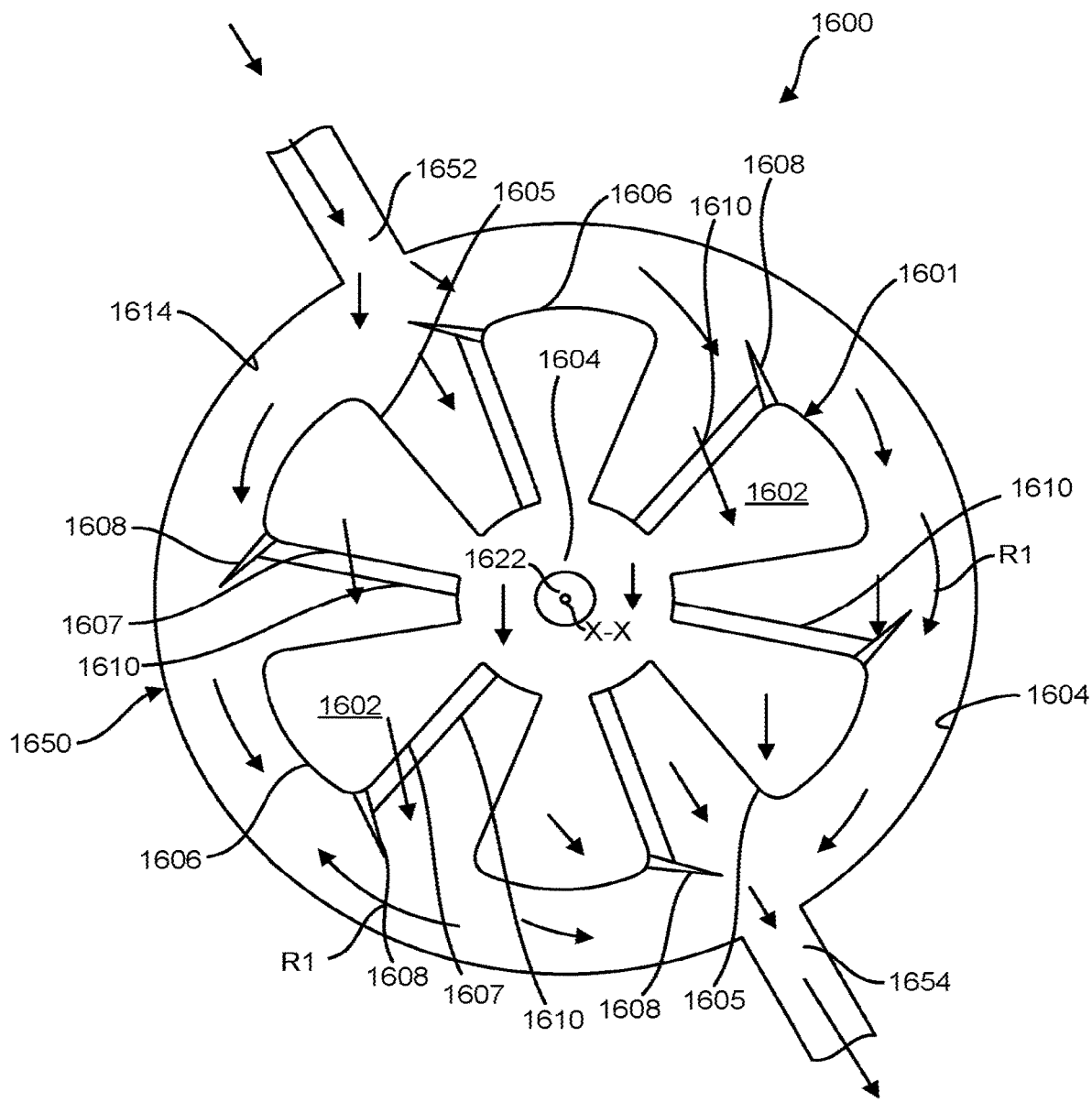
FIG. 22 illustrates a top cross-sectional view of an exemplary embodiment of a sensor utilizing the EHD rotary system of FIG. 4.

FIG. 22 illustrates an EHD-driven sensor, gauge or meter that utilizes an EHD rotary system and method of the present disclosure to rotate a rotary device and measure the rotation thereof based on changes of fluid within the sensor to obtain information about the fluid. As shown in FIG. 20, a sensor 1600 may incorporate an EHD rotary system according to the present disclosure to rotate a rotary device 1601 with a plurality or radially-extending and angularly spaced blades 1602. The blades 1602 may or may not include an angle of attack/pitch and/or form an airfoil shape to generate thrust and lift forces upon rotation about the axis X-X. As shown in FIG. 22, the rotary device 1601 may rotate about an axis of rotation X-X in a first rotational direction R1 within a casing or housing 1650. The casing 1650 may form an enclosure that defines or contains the fluid environment in which that the rotary device 1601 rotates within. The rotary device 1601 may rotate about the axis of rotation X-X in the first rotational direction R1 on/over a shaft portion 1622 within the casing 1655, or the rotary device 1601 may be fixedly coupled to a shaft portion 1622 that is configured to rotate about the axis of rotation X-X in the first rotational direction R1 within the casing 1655.

As shown in FIG. 22, the casing 1650 may include an inlet aperture 1652 that provides for an inlet flow of the fluid into the casing 1650, and an outlet aperture 1654 that provides for an outlet flow of the fluid out of the casing 1650. As such, the interior of the casing 1650, the inlet aperture 1652 and the outlet aperture 1654 may form a flowpath through the casing 1650.

The blades 1602 may include front leading edges or surfaces 1605 and back trailing edges or surfaces 1607 that trail the respective leading surfaces 1605 during rotation of the blades 1602 in the first rotational direction R1. The back trailing edges 1607 of at least some of the blades 1602 include at least one electrically conductive rotary emitter electrode. For example, the rotary emitter electrode of the back trailing edges 1607 of the blades 1602 may include at least one electrically conductive projection 1608 extending outwardly therefrom, and at least one electrically conductive radially-extending member 1610 extending radially from at least the at least one projection 1608 at least partially to a hub portion 1604 of the rotary device 1601 and/or the shaft portion 1622. The rotary device 1601 (e.g., at least the trailing back edges 1607) may be formed of an electrically insulative material and/or covered or encased by an electrically insulative material.

As shown in FIG. 22, at least a portion of the interior sides of the casing 1650 extending axially about the rotary device 1601 about the axis of rotation X-X includes a counter electrode 1614. The counter electrode 1614 may be similarly configured to the counter electrode 114 described above. The rotary device 1601 may be similarly configured to the propellers or other rotary devices 101, 201, 301, 401, 501, 601, 701 and/or 801 described above, and/or the blades 1602 may be similarly configured to the blades 102, 202, 302, 402, 502, 602, 702 and/or 802 described above. In this way, the sensor 1600 may include an electrical system/voltage source that applies a potential difference between the at least one rotary emitter electrode of the plurality of blades 1602 and the counter electrode 1614 that generates an electrical field and corona discharges from the at least one rotary electrode that form flows of ionic wind emanating therefrom that rotate the rotary device 1601 about the axis of rotation X-X in the first direction R1, as shown in FIG. 22.

As the corona discharge from the at least one rotary emitter electrode of the plurality of blades 1602 is sensitive to the characteristics (e.g., pressure, humidity, particulate amount, etc.) of the fluid within the casing 1650 in which the rotary device 1601 rotates, the rotation of the rotary device 1601 about the axis X-X can be monitored as one or more fluids (gaseous or liquid) flow into and/or through the casing 1650 to determine or derive (implicitly) information about the fluid that the rotary device 1601 encounters. For example, the sensor 1600 may be used in conjunction with, or include, a tachometer, torque meter or other rotational metric measurement tool to measure a characteristic (angular speed, torque, acceleration/deceleration, etc.) of the rotation of the rotary device 1601 about the axis X-X to determine or derive (implicitly) information about the fluid within the casing 1650 that the rotary device 1601 encounters.

Figure 23:
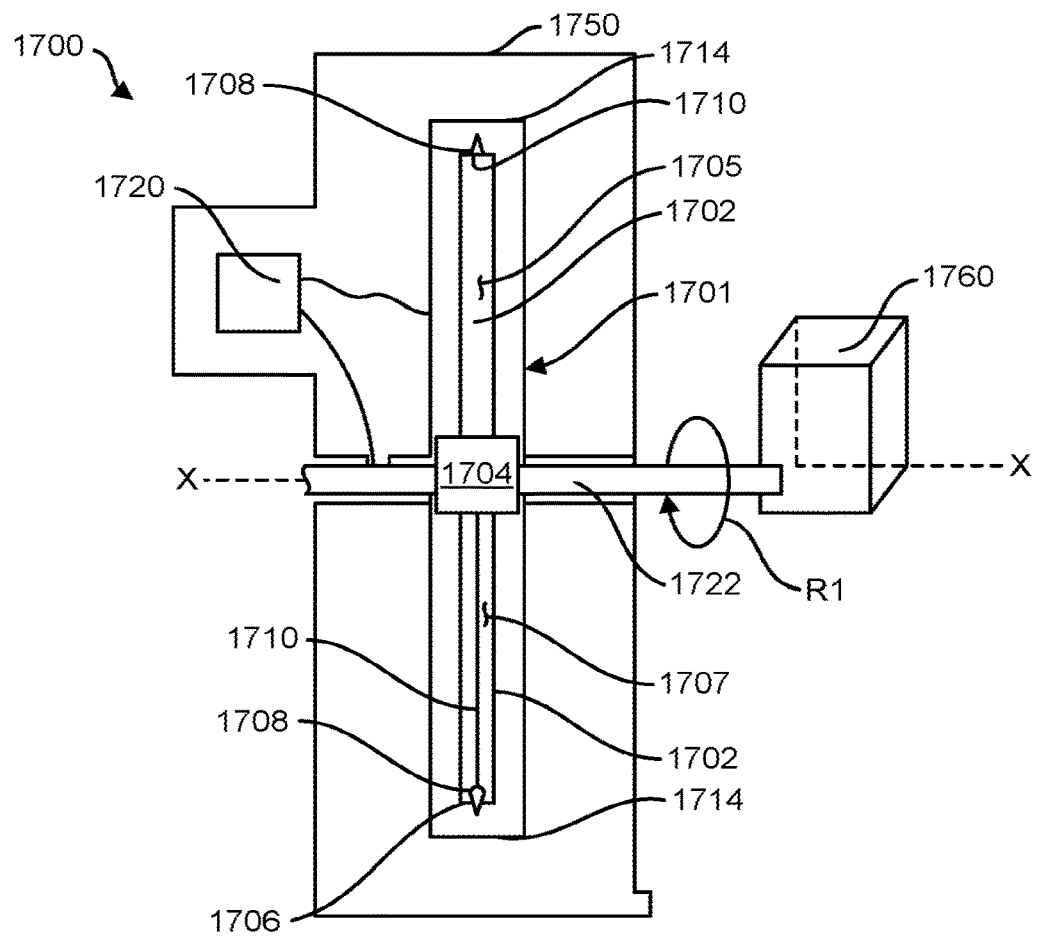
FIG. 23 illustrates a top cross-sectional view of an exemplary embodiment of a torque generator utilizing the EHD rotary system of FIG. 4.
Figure 24:
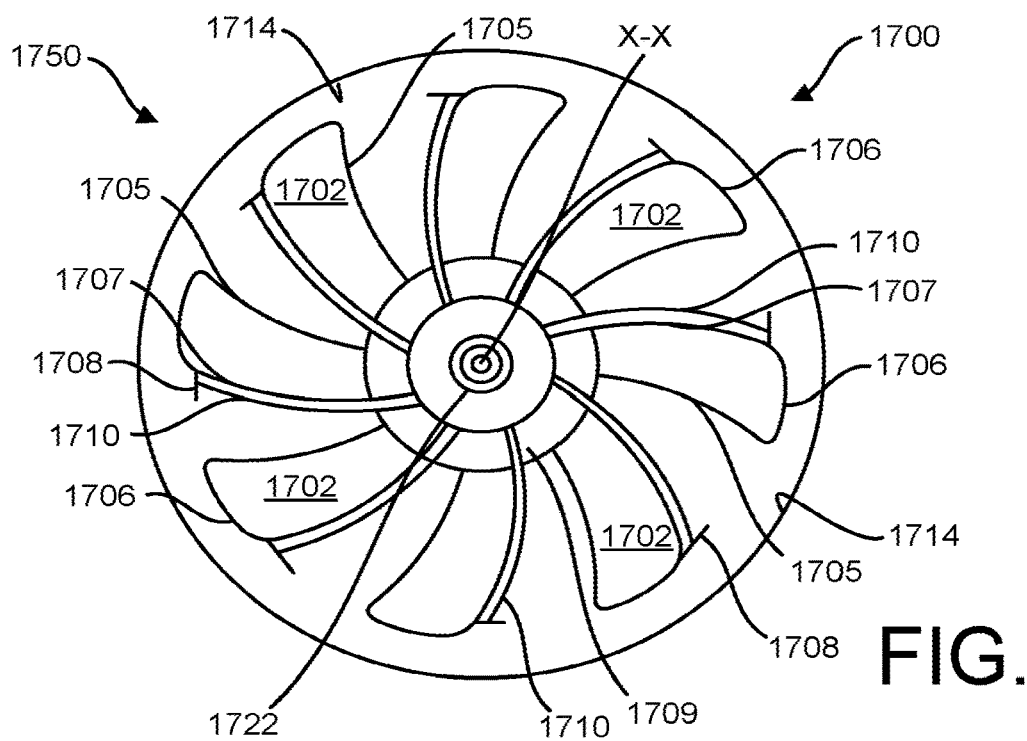
FIG. 24 illustrates a side cross-sectional view of the torque generator of FIG. 23.

FIGS. 23 and 24 illustrate an EHD-driven torque generator or motor that utilizes an EHD rotary system and method of the present disclosure to rotate a rotary device and, thereby, a shaft to provide rotational motion and force/torque to an object. As shown in FIGS. 23 and 14, a torque generator or motor 1700 may incorporate an EHD rotary system according to the present disclosure to rotate a rotary device 1701 with a plurality or radially-extending and angularly spaced blades 1702. The blades 1702 may or may not include an angle of attack/pitch and/or form an airfoil shape to generate thrust or lift forces upon rotation about the axis X-X. As shown in FIGS. 23 and 24, the rotary device 1701 may rotate about an axis of rotation X-X in a first rotational direction R1 within a casing or housing 1750. The rotary device 1701 may rotate about the axis of rotation X-X in the first rotational direction R1 on/over a shaft portion 1722 within the casing 1755, or the rotary device 1701 may be fixedly coupled to a shaft portion 1722 that is configured to rotate about the axis of rotation X-X in the first rotational direction R1 within the casing 1755.

The casing 1750 may form an enclosure that defines or contains the fluid environment in which that the rotary device 1701 rotates within. It is noted that the fluid environment in which that the rotary device 1701 rotates may effect the torque and/or rotational speed of the shaft portion 1722 generated by the EHD-driven torque generator or motor 1700. In some embodiments, the enclosure of the casing 1750 comprises a gaseous environment, such as an environment comprising air, O, O2, O3, CO, CO2, Ar, NH3, H, CH4, Ne, Natural gas, N, Cl, SF6, WF6, Kr, Xe, He, water vapor, or a combination thereof.

In some embodiments, the enclosure of the casing 1750 comprises a gaseous environment that is denser than air at the same temperature and pressure, which may generate a higher torque and/or angular speed as compared to an environment of air. In some embodiments, the enclosure of the casing 1750 comprises a gaseous environment that is less dense than air at the same temperature and pressure. In some embodiments, the enclosure of the casing 1750 comprises a liquid environment. For example, the casing 1750 comprise an environment comprising water, an oil, glycerin, liquid silicone, a halocarbon, hydrogen peroxide or a combination thereof.

The blades 1702 may include front leading edges or surfaces 1705 and back trailing edges or surfaces 1707 that trail the respective leading surfaces 1705 during rotation of the blades 1702 in a first rotational direction R1, as shown in FIGS. 23 and 24. The back trailing edges 1707 of at least some of the blades 1702 include at least one electrically conductive rotary emitter electrode. For example, the rotary emitter electrode of the back trailing edges 1707 of the blades 1702 may include at least one electrically conductive projection 1708 extending outwardly therefrom, and at least one electrically conductive radially-extending member 1710 extending radially from at least the at least one projection 1708 at least partially to a hub portion 1704 of the rotary device 1701 and/or the shaft portion 1722, as shown in FIGS. 23 and 24. The rotary device 1701 (e.g., at least the trailing back edges 1707) may be formed of an electrically insulative material and/or covered or encased by an electrically insulative material.

As shown in FIGS. 23 and 24, at least a portion of the interior sides of the casing 1750 extending axially about the rotary device 1701 about the axis of rotation X-X includes a counter electrode 1714. The counter electrode 1714 may be similarly configured to the counter electrode 114 described above. The rotary device 1701 may be similarly configured to the propellers or other rotary devices 101, 201, 301, 401, 501, 601, 701 and/or 801 described above, and/or the blades 1702 may be similarly configured to the blades 102, 202, 302, 402, 502, 602, 702 and/or 802 described above. In this way, the torque generator or motor 1700 may include an electrical system/voltage source 1720 that applies a potential difference between the at least one rotary emitter electrode of the plurality of blades 1702 and the counter electrode 1714 that generates an electrical field and corona discharges from the at least one rotary electrode that form flows of ionic wind emanating therefrom that rotate the rotary device 1701 about the axis of rotation X-X in the first direction R1, as shown in FIGS. 23 and 24. In this way, the EHD flow/corona wind may torque and rotate the rotary device 1701 about the axis of rotation X-X in the first direction R1 to rotate the shaft portion 1722 about the axis X-X in the first direction R1. As shown in FIG. 23, the torque and rotational/angular motion of the shaft portion 1722 of the torque generator or motor 1700 (generated via the EHD flow/corona wind) may be applied to any mechanism, object or system 1760 to effectuate rotational motion thereof or otherwise utilize the torque of the shaft portion 1722.

Figure 25:
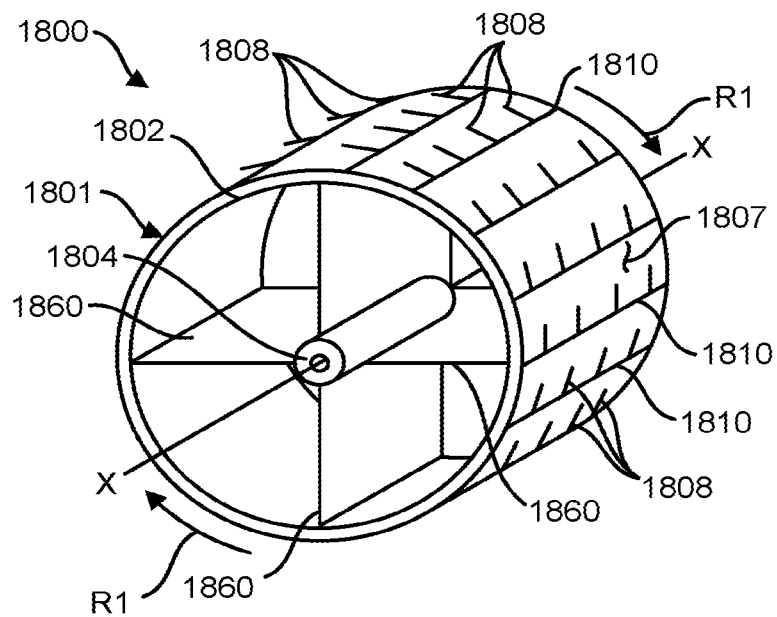
FIG. 25 illustrates an end perspective view of an exemplary embodiment of another EHD rotary system utilizing a rotary cylinder in accordance with an aspect of the present disclosure.
Figure 26:
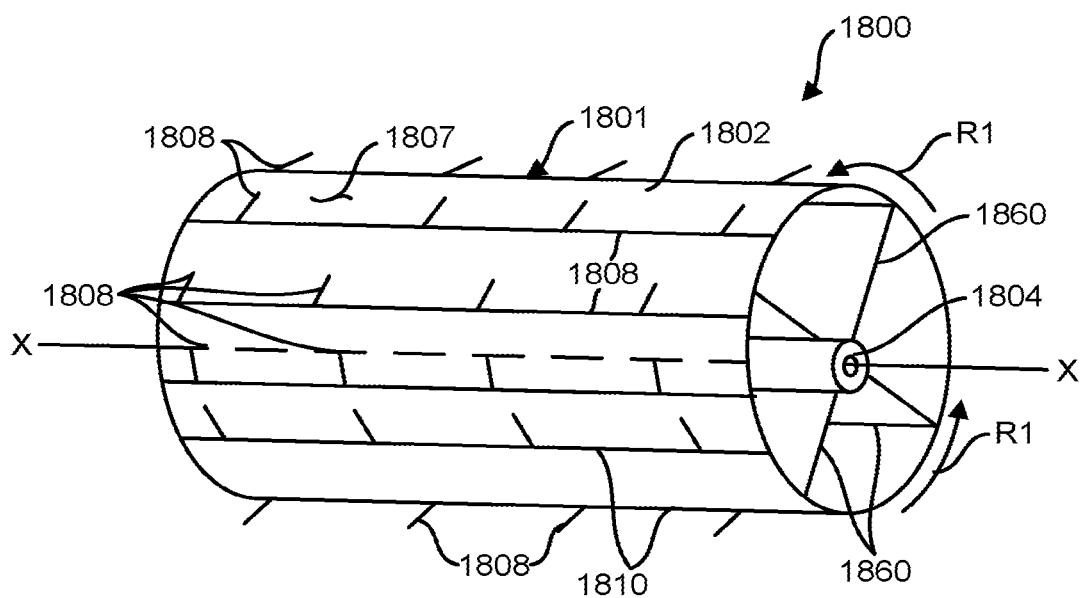
FIG. 26 illustrates a side perspective view of the EHD rotary system of FIG. 25.
Figure 27:
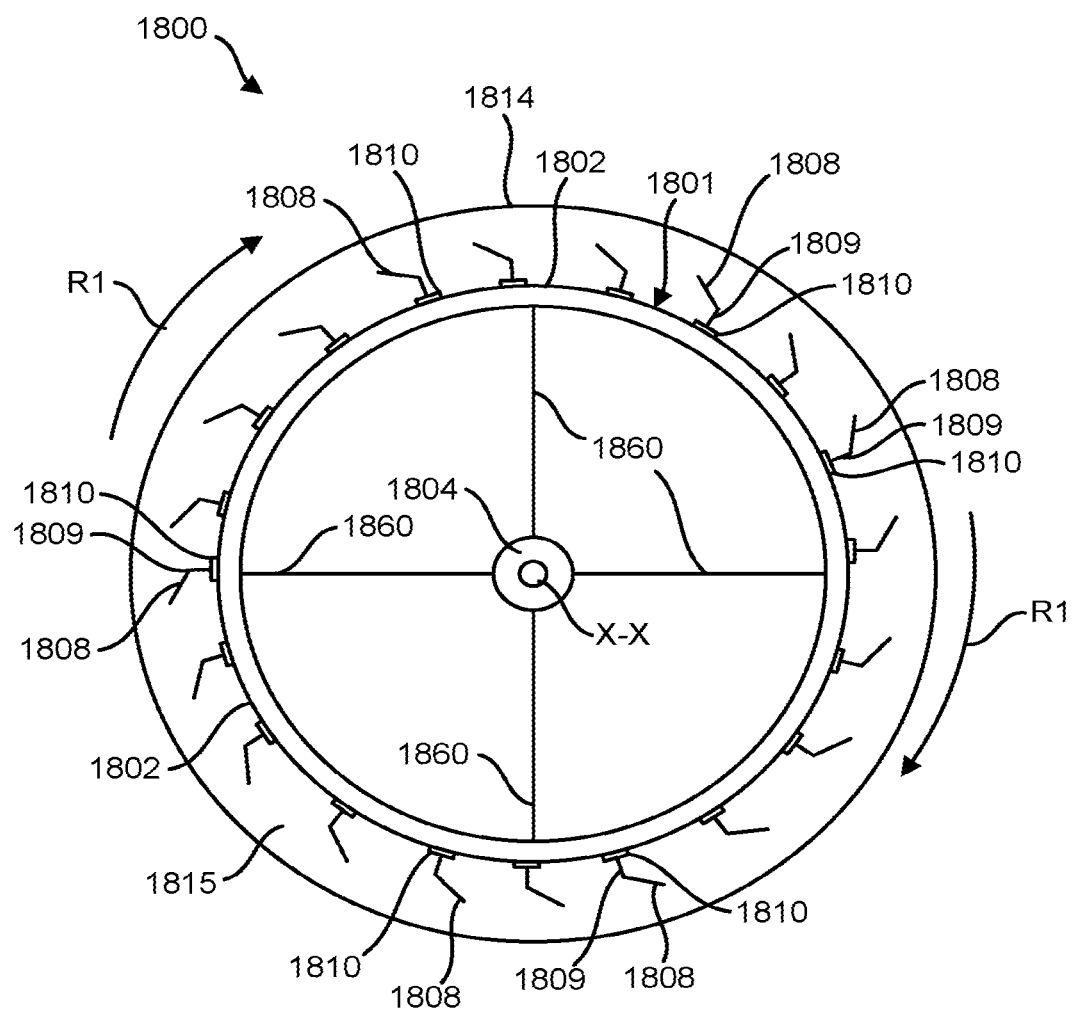
FIG. 27 illustrates a cross-sectional view of the EHD rotary system of FIG. 25 utilizing a rotary cylinder.

FIGS. 25-27 illustrate another EHD-based rotary system 1800 and related methods according to the present disclosure. Torque and/or angular motion provided by the rotary system 1800 (generated via EHD flow/corona wind) may be utilized for any number of a variety of differing potential applications by any number of a variety of differing mechanisms. For example, the EHD rotary system 1800 and related method of the present disclosure may be utilized with any fan, pump, turbine, jet, propeller, rotor or turbine.

As shown in FIGS. 25-27, the EHD rotary system 1800 may include a rotary device 1601 with an outer cylindrical member or portion 1802, a hub portion 1804 and one or more radial support members or portions 1860 extending between and coupling the cylindrical portion 1802 and the hub portion 1804. The rotary device 1801 also includes an axis or rotation X-X about which the cylindrical portion 1802, hub portion 1804 and one or more radial support members 1860 rotate. The hub portion 1804 may rotate about the axis of rotation X-X on/over a shaft portion (not shown), or the rotary device 1601 may be fixedly coupled to a shaft portion (not shown) that is configured to rotate about the axis of rotation X-X. The hub portion 1804 and at least one of the one or more radial support members 1860 may include an electrically conductive portion that electrically couples the shaft portion and the cylindrical portion 1802.

The cylindrical portion 1802 may include an axially-elongated circular outer surface 1807 that includes a plurality of angularly (e.g., circumferentially) and/or axially spaced or positioned electrically conductive emitter electrodes thereon, as shown in FIGS. 25-27. The plurality electrically conductive emitter electrodes are electrically coupled to the shaft portion (not shown) via the electrically conductive portions of the hub portion 1804 and the one or more radial support members 1860 such that the relatively high voltage above corona onset is applied to the plurality of emitter electrodes via the shaft portion, as described above.

As shown in FIGS. 25-27, the plurality of electrically conductive emitter electrodes comprise a plurality of electrically conductive axially-extending members 1810 and a plurality of electrically conductive projections 1808 that extend away from the outer surface 1807 of the cylindrical portion 1802. The axially-extending members 1810 and the projections 1808 are electrically coupled, and the axially-extending members 1810 are electrically coupled to the shaft portion (not shown), such as via the electrically conductive portions of the hub portion 1804 and the one or more radial support members 1860.

The plurality of electrically conductive projections 1808 may be oriented at least generally in a common angular or rotational direction about the axis X-X, as shown in FIGS. 25-27. For example, each of the plurality of projections 1808 may extend away from the outer surface 1807 of the cylindrical portion 1802 in the same direction, as shown in FIGS. 25-27. In some embodiments, each of the plurality of projections 1808 may extend tangentially away from the outer surface 1807 from the cylindrical portion 1802 in the same direction, as shown in FIGS. 25-27. In some embodiments, each of the plurality of projections 1808 may extend away from the outer surface 1807 from the cylindrical portion 1802 on an angle that extends radially-outwardly and angularly.

The axially-extending members 1810 may be angularly or rotationally spaced from each other, as shown in FIGS. 25-27. The axially-extending members 1810 may extend radially along the cylindrical portion 1802 and include a plurality of axially-spaced projections 1808 extending therefrom, as shown in FIGS. 25 and 26. In such embodiments, the axially-extending members 1810 may extend to, or proximate to, a first axial end of the cylindrical portion 1802. The first axial end of the cylindrical portion 1802 may include a circumferentially extending electrically conductive contact (not shown) that electrically couples the axially-extending members 1810 together. In some such embodiments, the contact (not shown) may be coupled to the shaft portion (not shown), such as via the electrically conductive portions of the hub portion 1804 and the one or more radial support members 1860.

The axially-extending members 1810 may or may not be exposed. For example, in some embodiments, the axially-extending members 1810 may be covered or encased by an electrically insulative material. In some other embodiments, at least a portion of the axially-extending members 1810 may be exposed. In some embodiments, the cylindrical portion 1802 may comprise, or be covered or encased by, an electrically insulative material such that the cylindrical portion 1802 itself is not electrically coupled to the rotary emitter electrodes and does not interfere with the formation of an electric field between the rotary emitter electrodes (e.g., the plurality of projections 1808) and a counter electrode 1814.

As shown in FIG. 27, the rotary device 1601 may be positioned within a cavity 1815 of a cylindrical electrically conductive counter electrode 1814 (as discussed above). The rotary device 1601 is configured to rotate about the axis X-X within the cavity 1815 of the counter electrode 1814. The counter electrode 1814 may be similarly configured to the counter electrode 114 described above. In this way, the EHD rotary system 1800 may include an electrical system/voltage source (not shown) that applies a potential difference between the plurality of rotary emitter electrodes (e.g., the plurality of projections 1808) on the outer surface 1807 of the cylindrical portion 1802 and the counter electrode 1614 that generates an electrical field and corona discharges from the plurality of rotary electrodes that form flows of ionic wind emanating therefrom that rotate the rotary device 1601 about the axis of rotation X-X in a first direction R1, as shown in FIGS. 25-27.

As shown in FIG. 27, in some embodiments the plurality of projections 1808 may include arm portions 1809 that extend (at least partially) radially away from the outer surface 1807 of the cylindrical portion 1802. The plurality of projections 1808 may extend angularly or in a rotational direction therefrom (e.g., tangentially with respect to the rotational or angular path of the projections 1808 or angularly and radially outwardly), as shown in FIG. 27. The arm portions 1809 may thereby space the plurality of projections 1808 from the outer surface 1807 of the cylindrical portion 1802, such as to prevent the outer surface 1807 of the cylindrical portion 1802 from interfering with the EHD flow/corona wind emenating from the plurality of projections 1808.

In some alternative embodiments, as opposed to the axially-extending members 1810, the rotary device 1601 may include a plurality of axially-spaced circumferentially-extending (or angularly-extending) members that include a plurality of circumferentially or angularly spaced electrically conductive projections 1808 extending therefrom.

EXAMPLES

Hereinafter, inventions of the present disclosure will be described in detail with reference to examples, but the Examples are expressly not meant to limit the scope of the present inventions.

Commercial plastic propellers were converted to EHD propellers by equipping them with conductive electrodes on the blades. A dielectric layer was normally used to partially cover the electrode leaving the edge exposed to air at the trailing edge of the blade. An axial shaft was used to inject high voltage (HV) in the blades through conductive material running along the blades. A surrounding ground electrode (a metal cylinder) was utilized to create an intense electric field when high-voltage above corona onset was applied to the electrodes.

Corona wind formation was mediated by electric field forces acting both on gaseous charges and propeller. Conservation of overall momentum lead to forces acting on the propeller blades, which created torque and eventually propeller rotation. Propellers were tested in the negative polarity, and ranged from 0.2 g and 3.5 cm diameter to 28 g and 25 cm diameter. They were able to spin and fly either off the shaft or sliding upwards on the shaft.

Specifically, conductive material was aligned along the trailing edge of the blades. The material conductive was copper foil tape with double conductive adhesive of 0.035 mm thickness. Bare conductive electric paint and 46 AWG tungsten wire were also used as the conductive material of the electrode components. Metal pins were cut to about 1 cm length and used either with sharp or blunt ends (both designs supported flight). The pins were electrically connected to the copper tape or a metal wire set along at least one propeller blade. 3M™ PTFE Film Electrical Tape 61 was used for partial covering of the conductive material. However, some propellers did not include the insulation, and the propeller liftoff was also obtained with such propellers At (or towards) the end of each blade tip, a metal pin about 0.5-1 cm long (connected to the conductive material on the blade) was attached. The metal pins were oriented substantially orthogonally to the local rotational radius. The propellers were mounted on a high voltage shaft or balanced on a sharp vertical shaft, which injects high voltage (HV) into the blades through the conductive material running along them. In one alternative setup, a metal bead was placed coaxially on the HV shaft and sustained the weight of the propeller so that it could spin or slide on the vertical shaft. High voltage was applied from Glassman power supplies (+60 kV—PS/FR60P05.0, −60 kV—PS/FR60N05.0) or Gamma High Voltage Research model ES60R 20 W/DAM/OL.

An intense non-uniform electric field was created on the propeller electrode to generate ionic wind in order to make the EHD propeller spin. The counter electrodes were mainly metal cylinders, but metal disks and parallel plates were also tested. Each of the tested counter electrode designs supported liftoff for some of the tested propellers. Different counter electrode materials were also tested. Similar sizes of copper, aluminum, and steel cylinders did not result in significant rotational speed changes in the experiments. Some of the propellers were placed coaxially inside a grounded cylindrical electrode, and some propellers were positioned outside the cylindrical electrode (e.g., beneath, above and sideways). Each of the positions of the cylindrical electrode supported propeller liftoff, although some required larger voltage values.

A Photron high speed camera FASTCAM SA-X2 1000K-M4—Monochrome 1000K with 64 GB memory was used for recording the rotational motion of the propellers. The frame rates ranged from 500 to 30,000 fps. Determination of the rotational speeds were manually performed by analyzing individual video frames or using a digital laser tachometer DT-2234C+, with 0.05% accuracy.

Different EHD propellers and counter electrodes were tested to voltages up to −60 kV. A first tested propeller was 27.8 g, 25 cm in diameter, and included copper tape on the trailing edges of the blades and two pins per blade. Flight of the first propeller was induced at −52 kV, 4.7 cm below a centered 61 cm diameter ground disk counter electrode. A second tested propeller was 0.46 g, 4.6 cm in diameter, and included conductive ink on the trailing edges of the blades. Flight of the second propeller was induced at −28.9 kV in a 10.5 cm diameter, 11 cm height copper cylinder counter electrode. A third tested propeller was 8 g, 12.5 cm in diameter, and included copper tape on the blades and one pin per blade. Flight of the third propeller was induced at −60 kV, 4.7 cm below a centered 61 cm diameter ground disk counter electrode. A fourth tested propeller was 0.58 g, 4 cm in diameter, and included copper tape and one pin on the trailing edges of the blades. Flight of the fourth propeller was induced at −32 kV in a 10.5 cm diameter, 11.2 cm height copper cylinder counter electrode.

Another set of propellers were tested for liftoff regimes. A first tested propeller was 0.582 g, 4 cm in diameter, and included three blades with copper tape and one pin per blade; the applied voltage at takeoff was −25.8 kV, and the test was performed in a 10.5 cm diameter, 11 cm height grounded copper cylinder counter electrode. A second tested propeller was 8 g, 12.5 cm in diameter, and included six blades with two opposite blades equipped each with copper tape and one pin; the applied voltage at takeoff was −36 kV, and the test was performed in the 10.5 cm diameter, 11 cm height grounded copper cylinder counter electrode.

Rotational speed characteristics for a 44 g, 25 cm radius, five-blade propeller designed with copper tape along the blade trailing edges and placed axially above and parallel to a 61 cm diameter ground metal disk counter electrode were also tested. The distance between the ground disk and the parallel propeller plane was 3 cm, and the distance to ground disk was 6 cm. A linear variation of the rotational speed with applied voltage was confirmed by a regression coefficient.

In the case of a propeller set axially, parallel, and above a disk ground electrode, the induced rotational speed was proportional to the applied voltage. The vertical thrust and rotational speed was a function of applied voltage for an only partially optimized propeller-cylinder system (negative polarity). Positive polarity was also tested, but the voltage range for induced rotation (after propeller rotation started and before breakdown was reached) was only 2 kV. A linear range of the terminal rotational speed with applied voltage (at voltages much larger than the corona onset) was apparent in some tests conducted in air, CO2, and SF6. Testing a six-blade propeller showed that current increased linearly with the number of active blades (equipped with copper tape). A similar linear increase with the number of EHD-active blades (except for the case of a single coper tape blade) was apparent for the vertical thrust of a tested propeller. Thrust measurements were performed in the negative polarity. The distance between high voltage electrode and the scale allowed for minimum interference so that the scale would always return to zero when the voltage was turned off.

In some experiments, the rotational speed increased as a propeller was lowered in the cylinder axis of the cylindrical counter electrode while keeping the voltage constant. When the length of the copper tape on the blades was extended from the center of the blade along a radius, the rotational speed appeared to increase linearly. When the copper tape (or wire) was translated across the width of the blade, while keeping its length and voltage constant, the rotational speed decreased towards the central positioning and ceases there. When the electrode was translated past the central position on the blade, the propeller reversed direction of rotation. The corresponding current had a minimum on the central position.

In some experiments, the angular speed of the propellers varied with the variation of the copper tape width on the blade for constant voltage applied while one side of the tape was aligned on the trailing edge of the blade. Testing was performed using insulating electrical tape on the non-trailing edge of the copper tape; also, with no insulation. Both situations indicated the presence of a maximum for the rotational speed. When the copper tape fully covered the width of a blade of a propeller, the speed reduced significantly in the insulated case and dropped to zero if no insulation is present—indicating that the ionization region was much contained within the thickness of the insulating tape which disrupted the EHD flow and thrust. It also pointed to the EHD flow being the actuator in the system. Direct flow visualizations around the blade showed that no propeller rotation was present before EHD flow was initiated. For comparison, a 46 AWG wire electrode (the same length as the copper tape) was used on some blades.

Propeller rotation was also controlled by the design of the counter electrode. The inner side of a glass cylinder counter electrode was only partly covered with vertical aluminum foil strips, and an EHD propeller was tested inside it at constant voltage. Full metal coverage of the cylinder provided maximum rotational speed, while current was maximum when coverage area was about 60%. Propeller flight was achieved only in certain situations, which showed that the resultant force on the propeller was significantly influenced by the counter electrode design.

The current voltage characteristics of a propeller for both negative and positive polarities along with the corresponding rotational speed was also tested. Breakdown occurred at much smaller voltages for positive than for the negative polarity. Various other propeller setups showed similar outcomes, and they led to higher rotational speed achievable in the negative polarity in the tests. Negative polarity was thereof particularly studied.

In some experiments, propellers were tested at and below atmospheric pressure (Po) using the same EHD propeller-cylinder system each time. At each pressure, maximum voltage (before breakdown occurs) was applied. The lowest pressure at which propeller flight was still obtained was between 0.7 PO and 0.8 PO. A quasi-linear variation of rotational speed with pressure was apparent, thereby predicting much larger achievable EHD forces at pressures above PO. Propeller performance in other gases was also tested at atmospheric pressure. The maximum achievable rotational speed at PO (with the used power supply) clustered around 28 rot/s for in air, carbon dioxide ($CO_2$), and sulfur hexafluoride ($SF_6$). The corresponding voltages were −60 kV in $SF_6$, −27 kV in air, and −31.5 kV in $CO_2$. As the specific gravity for $CO_2$ is larger than 1.5 and for $SF_6$ is larger than 5, it was apparent that more EHD force was generated for $CO_2$ than in air, and much more in $SF_6$ at the specified parameters. Testing at PO for krypton (Kr), nitrogen (N), and argon (Ar) showed very low values for propeller rotational speed, whereas testing in helium (He) resulted in insufficient EHD torque to compensate for friction. In addition, no propeller rotation was achieved below PO for Kr, N, Ar, and He.

In some experiments, a comparison of propeller performance in gases at atmospheric pressure were tested, as described above. An EHD propeller of 2.3 g, 12.6 cm in diameter was placed axially on a high voltage metal rod and 2.5 cm inside an 18 cm high, 14 cm-inner diameter ground cylinder counter electrode. The system was placed in a glass enclosure equipped with a three-way "open/close/open" valve connected to a rotary vacuum pump, pressure gage, and gas supply pipe. Pressure inside the glass bell was controllable in 0.1 PO increments. Data was collected at the highest voltage achievable before breakdown or the power supply tripped. All liquid gases used has 5.0 purity and were obtained from Linde Gas, Romania. The propeller in $SF_6$ had a voltage of 60 kV, a current of 0.33 mA, a rotational speed of 27 rot/s, a gas density of 6.17 kg/m^3, a gas specific gravity of 5.12, and flight of the propeller was achieved. The propeller in $CO_2$ had a voltage of 27 kV, a current of 0.34 mA, a rotational speed of 29 rot/s, a gas density of 1.81 kg/m^3, a gas specific gravity of 1.51, and flight of the propeller was achieved. The propeller in air had a voltage of 27 kV, a current of 0.34 mA, a rotational speed of 29 rot/s, a gas density of 1.2 kg/m^3, a gas specific gravity of 1, and flight of the propeller was not achieved. The propeller in Kr had a voltage of 15 kV, a current of 0.06 mA, a rotational speed of 6 rot/s, a gas density of 3.74 kg/m^3, a gas specific gravity of 3.11, and flight of the propeller was not achieved. The propeller in N had a voltage of 7.5 kV, a current of 0.17 mA, a rotational speed of 2 rot/s, a gas density of 1.16 kg/m^3, a gas specific gravity of 0.96, and flight of the propeller was not achieved. The propeller in Ar had a voltage of 8 kV, a current of 0.07 mA, a rotational speed of 1.8 rot/s, a gas density of 1.64 kg/m^3, a gas specific gravity of 1.36, and flight of the propeller was not achieved. The propeller in He had a voltage of 6 kV, a current of 0.2 mA, a rotational speed of 0 rot/s, a gas density of 0.163 kg/m^3, a gas specific gravity of 0.14, and flight of the propeller was not achieved.

The tested EHD systems and propellers were also compared to classic EHD thrusters. Classic EHD thrusters accelerate ions one direction and thrust is obtained in the opposite direction. With the rotational EHD thrusters described herein, in some embodiments most of the ions may accelerate within a rotational plane of the propeller, while the propeller-counter-electrode system converts the thrust to a direction orthogonal to it. The 90 degree shift is obtained at the expense of frictional losses in the propeller shaft and due to the gaseous media flow through the system. For some tested rotational EHD devices of the present disclosure, using power supply readings for voltage and current at propeller liftoff in air, lead to estimated lower limits for thrust to power ratio of 5.4 N/kW at −43 kV and thrust density of 3.73 N/m2 for attested 28 g, 25 cm in diameter four-blade propeller in a cylinder counter electrode of 30.5 cm in diameter. Also, 8.3 N/kW (the top value obtained in air) and 1.57 N/m2 at −19.5 kV were lower estimates at liftoff for a tested 2.3 g, 12.6 cm diameter two-blade propeller in a cylinder counter electrode of 13.5 cm in diameter. The values were competitive to values reported for an ionic plane, which had a sustained flight at about 5 N/kW and a designed/desired thrust density of 3 N/m^2. In addition, lower-limits estimated from a tested 2.3 g-propeller liftoff at atmospheric pressure gave 14.3 N/kW and 1.57 N/m2 at −21 kV in $CO_2$ and 30.48 N/kW and 1.57 N/m2 at −21 kV in $SF_6$.

It is noted that thrust to power ratio is a quantity that can change dramatically with the voltage applied and also with slight modifications in the electrode design or positioning. The estimates were calculated at the propeller liftoff/flight (i.e., EHD thrust is at least the weight of the propeller). The EHD rotational systems were only partly optimized. The EHD forces were spatially concentrated towards the end terminal of the HV electrode emitters placed towards the blade ends. Although relatively small, the EHD forces could generate significant torque through the lever arm. Rotational kinetic energy is incrementally accumulated and stored in the propeller rotation. This is phenomenon differs from classic EHD thrusters which do not integrate energy for liftoff.

The EHD rotational systems of the present disclosure appeared to be versatile with respect to thrust direction and control. Rotational direction was controlled by the position of the emitter electrodes on the blades. Further, in some embodiments, the propellers or other rotary devices may include mobile or repositionable emitters to control the direction of rotation of the propeller/rotary device. As another benefit, a pair of left and right propellers of the present disclosure could be configured to spin on the same axis and create thrust while keeping zero the total angular momentum. As such, pairs of left-right spinning propellers on the same axis could b utilized for an EHD aerial vehicle (e.g., a drone) with no need for additional angular momentum compensation used in classical helicopters.

Still further, classical EHD thrusters may use multiple stages to enhance thrust. The EHD rotational systems of the present disclosure can achieve a similar effect with additional blades or multiple propellers placed on the same axis. In contrast to classic thrusters, the EHD rotational systems of the present disclosure appear to result in more homogeneous thrust (e.g., potentially due to rapid rotation of the emitter propeller electrodes) as compared to classical EHD thrusters, potentially providing a smoother vertical thrust (potentially even in non-uniform distributions of the electric field) as compared to classical EHD thrusters.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. For example, the material, conductivity, resistivity, shape, orientation and position of the rotary electrode(s) and the counter electrode(s) may vary without departing form the spirit and scope of the inventions. As another example, the composition, configuration or dielectric strength of the insulating material or portions may vary without departing form the spirit and scope of the inventions. As yet another example, the pitch, shape, size and number of the blades of the propellers or other rotary devices may vary without departing form the spirit and scope of the inventions. As a further example, the number of propellers or other rotary devices used in conjunction with a single ground electrode may vary without departing form the spirit and scope of the inventions. As another example, the amount of voltage and/or current applied to the rotary emitter electrodes may vary without departing form the spirit and scope of the inventions.

While dimensions and types of materials may be described herein, they are intended to define parameters of some of the various examples, and they are by no means limiting to all examples and are merely exemplary. Many other examples will be apparent to those of skill in the art upon reviewing the above description. The scope of the various examples should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as referee labels, and are not intended to impose numerical, structural or other requirements on their objects. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular example. Thus, for example, those skilled in the art will recognize that the devices, systems and methods described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of examples, it should be readily understood that the disclosure is not limited to such disclosed examples. Rather, this disclosure can be modified to incorporate any number of variations, alterations, substitutions or equivalent arrangements not heretofore described, but which are commensurate with the spirit and scope of the disclosure. Additionally, while various examples have been described, it is to be understood that aspects of the disclosure may include only one example or some of the described examples. Also, while some examples are described as having a certain number of elements, it will be understood that the examples can be practiced with less than or greater than the certain number of elements.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed:

1. An electrohydrodynamic (EHD) rotary system, comprising:

at least one rotary device comprising a hub portion, an axis of rotation, and at least one blade extending radially from the hub portion to a tip thereof, the at least one blade comprising a front leading edge, a back trailing edge and top and bottom surfaces that extend between the front and back edges;

at least one rotary electrode emitter, the at least one rotary electrode being electrically conductive and coupled to the at least one blade of the at least one rotary device proximate to the back edge thereof;

at least one counter electrode, the at least one counter electrode being electrically conductive and positioned proximate to the at least one rotary device in a spaced relationship;

an electrical system comprising a voltage source including a first terminal that is electrically coupled to the at least one rotary electrode emitter and a second terminal that is electrically coupled to the at least one counter electrode, the voltage source comprising an electric potential difference between the first and second terminals that generates corona discharges from the at least one rotary electrode that form flows of ionic wind emanating therefrom that rotate the at least one rotary device about the axis of rotation in a first direction; and wherein the hub portion comprises an electrically conductive portion that is electrically coupled to the at least one rotary electrode emitter.

2. The system of claim 1, wherein the at least one rotary electrode emitter comprises at least one radially-extending electrically conductive member extending proximate to the back trailing edge.

3. The system of claim 2, wherein at least a first outer surface portion of the at least one radially-extending electrically conductive member proximate to the back edge is exposed.

4. The system of claim 3, further comprising an electrically insulative material extending over at least a second outer surface portion of the at least one radially-extending electrically conductive member proximate to the front edge.

5. The system of claim 2, wherein the at least one radially-extending electrically conductive member extends one of:
over the back edge of the at least one blade, over at least one of the top surface and the bottom surface proximate to the back edge of the at least one blade, or along at least a portion of the hub portion and the at least one blade.

6. The system of claim 2, wherein the at least one radially-extending electrically conductive member is spaced from the front edge of the at least one blade.

7. The system of claim 2, wherein the at least one radially-extending electrically conductive member comprises a plurality of radially spaced electrically conductive members.

8. The system of claim 2, wherein the at least one radially-extending electrically conductive member comprises an integral member affixed to an outer surface portion of the at least one blade, a member embedded at least partially within the at least one blade, a conductive paint painted over an outer surface portion of the at least one blade or a conductive tape affixed over an outer surface portion of the at least one blade.

9. The system of claim 1, wherein the at least one blade of the at least one rotary device comprises a plurality of blades, and wherein the at least one rotary electrode emitter of each of the plurality of blades comprises at least one radially-extending electrically conductive member that extends proximate to the back trailing edge.

10. The system of claim 2, wherein the at least one rotary electrode emitter further comprises at least one electrically conductive projection that extends away from the back trailing edge of the at least blade in a direction extending from the front leading edge to the back trailing edge, the at least one radially-extending electrically conductive member and the at least one electrically conductive projection being electrically coupled.

11. The system of claim 10, wherein the at least one electrically conductive projection extends from one of:
the back edge of the at least one blade, or one of the top surface and the bottom surface proximate to the back edge of the at least one blade.

12. The system of claim 10, wherein the at least one electrically conductive projection comprises a plurality of radially spaced electrically conductive projections.

13. The system of claim 10, wherein the at least one electrically conductive projection is positioned proximate to the tip of the at least one blade and distal to the hub portion.

14. The system of claim 1, wherein the at least one blade of the at least one rotary device comprises a plurality of blades, and wherein the at least one rotary electrode emitter of each of the plurality of blades comprises at least one electrically conductive projection that extends away from the back trailing edge of the at least blade in a direction extending from the front leading edge to the back trailing edge.

15. The system of claim 1, wherein the spaced relationship between the at least one rotary device and the at least one counter electrode is an adjustable spaced relationship.

16. The system of claim 1, wherein the at least one rotary electrode emitter comprises at least one electrically conductive projection that extends away from the back trailing edge of the at least one blade in a direction extending from the front leading edge to the back trailing edge.

17. An electrohydrodynamic (EHD) rotary system, comprising:
at least one rotary device configured to convert rotational motion thereof about an axis of rotation in a first direction into thrust, the at least one rotary device comprising a hub portion aligned with the axis of rotation, and at least one blade extending radially from the hub portion to a tip thereof, wherein the at least one blade comprises a front leading edge, a back-trailing edge and top and bottom surfaces that extend between the front and back edges;
at least one rotary electrode emitter, the at least one rotary electrode being electrically conductive and coupled to at least one blade of the at least one rotary device proximate to the back edge thereof;
at least one counter electrode, the at least one counter electrode being electrically conductive and positioned proximate to the at least one rotary device in a spaced relationship;
an electrical system comprising a voltage source including a first terminal that is electrically coupled to the at least one rotary electrode emitter and a second terminal that is electrically coupled to the at least one counter electrode, the voltage source comprising an electric potential difference between the first and second terminals that generates corona discharges from 4 the at least one rotary electrode that form flows of ionic wind emanating therefrom that rotate the at least one rotary device about the axis of rotation in the first direction; and wherein the at least one rotary electrode emitter comprises at least one radially-extending electrically conductive member extending proximate to the back-trailing edge and at least one electrically conductive projection that extends away from the back-trailing edge of the at least blade in a direction extending from the front leading edge to the back-trailing edge, the at least one radially-extending electrically conductive member and the at least one electrically conductive projection being electrically coupled.

18. The system of claim 17, wherein the at least one blade of the at least one rotary device comprises a plurality of blades, and wherein the at least one rotary electrode emitter of each of the plurality of blades comprises the at least one radially-extending electrically conductive member and the at least one electrically conductive projection.

19. An electrohydrodynamic (EHD) rotary system, comprising:
at least one rotary device comprising a hub portion, an axis of rotation, and at least one blade extending radially from the hub portion to a tip thereof, the a least one blade comprising a front leading edge, a back trailing edge and top and bottom surfaces that extend between the front and back edges;
at least one rotary electrode emitter, the at least one rotary electrode being electrically conductive and coupled to the at least one blade of the at least one rotary device proximate to the back edge thereof;
at least one counter electrode, the at least one counter electrode being electrically conductive and positioned proximate to the at least one rotary device in a spaced relationship;
an electrical system comprising a voltage source including a first terminal that is electrically coupled to the at least one rotary electrode emitter and a second terminal that is electrically coupled to the at least one counter electrode, the voltage source comprising an electric potential difference between the first and second terminals that generates corona discharges from the at least one rotary electrode that form flows of ionic wind emanating therefrom that rotate the at least one rotary device about the axis of rotation in a first direction; and
wherein the hub portion comprises a shaft extending along the axis of rotation, and wherein the shaft comprises an electrically conductive portion that is electrically coupled with the at least one rotary electrode emitter.

20. The system of claim 19, wherein the hub portion is one of: rotatably mounted on the shaft such that the at least one rotary device rotates on the shaft about the axis of rotation, or fixedly coupled with the shaft such that rotation of the at least one rotary device about the axis of rotation rotates the shaft about the axis of rotation.

* * * * *